US008934026B2

(12) United States Patent
Tian et al.

(10) Patent No.: US 8,934,026 B2
(45) Date of Patent: Jan. 13, 2015

(54) SYSTEM AND METHOD FOR VIDEO CODING IN A DYNAMIC ENVIRONMENT

(75) Inventors: Dihong Tian, San Jose, CA (US); Wen-Hsiung Chen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 765 days.

(21) Appl. No.: 13/106,002

(22) Filed: May 12, 2011

(65) Prior Publication Data

US 2012/0287302 A1 Nov. 15, 2012

(51) Int. Cl.
*H04N 5/228* (2006.01)
*H04N 7/18* (2006.01)
*H04N 7/14* (2006.01)
*H04N 21/4223* (2011.01)
*H04N 21/61* (2011.01)
*H04N 21/6547* (2011.01)
*H04N 19/82* (2014.01)
*H04N 5/232* (2006.01)

(52) U.S. Cl.
CPC ....... *H04N 21/4223* (2013.01); *H04N 21/6125* (2013.01); *H04N 21/6547* (2013.01); *H04N 19/00896* (2013.01); *H04N 5/23206* (2013.01)
USPC ...................... 348/222.1; 348/143; 348/14.13

(58) Field of Classification Search
CPC . H04N 7/15; H04N 13/0477; H04N 21/4223; H04N 21/6125; H04N 21/6547; H04N 5/23206; H04N 7/147
USPC .......... 348/143, 211.99, 211.1–211.8, 207.1, 348/207.11, 222.1, 223.1, 362
See application file for complete search history.

(56) References Cited

U.S. PATENT DOCUMENTS

| 2,911,462 | A | 11/1959 | Brady |
| D212,798 | S | 11/1968 | Dreyfuss |
| 3,793,489 | A | 2/1974 | Sank |

(Continued)

FOREIGN PATENT DOCUMENTS

| CN | 101953158 A | 1/2011 |
| CN | 102067593 | 5/2011 |

(Continued)

OTHER PUBLICATIONS

U.S. Appl. No. 13/298,022, filed Nov. 16, 2011, entitled "System and Method for Alerting a Participant in a Video Conference," Inventor(s): TiongHu Lian, et al.

(Continued)

*Primary Examiner* — Trung Diep
(74) *Attorney, Agent, or Firm* — Patent Capital Group

(57) ABSTRACT

A method is provided in one example embodiment and includes receiving a camera dynamic parameter; determining a reference transform parameter based on the camera dynamic parameter; applying the reference transform parameter to generate a video image; and encoding the reference transform parameter in a bitstream for transmission with the video image. In other more specific instances, the method may include decoding a particular video image; decoding a particular reference transform parameter; and applying a particular reference transform parameter to the particular video image. The entropy-decoded data can undergo inverse quantization and transformation such that reference transformed data is combined with the entropy-decoded data. Additionally, the entropy-decoded data can be subjected to filtering before decoded video images are rendered on a display.

20 Claims, 5 Drawing Sheets

(56) References Cited

U.S. PATENT DOCUMENTS

| | | | |
|---|---|---|---|
| 3,909,121 A | 9/1975 | De Mesquita Cardoso | |
| 4,400,724 A | 8/1983 | Fields | |
| 4,473,285 A | 9/1984 | Winter | |
| 4,494,144 A | 1/1985 | Brown | |
| 4,750,123 A | 6/1988 | Christian | |
| 4,815,132 A | 3/1989 | Minami | |
| 4,827,253 A | 5/1989 | Maltz | |
| 4,853,764 A | 8/1989 | Sutter | |
| 4,890,314 A | 12/1989 | Judd et al. | |
| 4,961,211 A | 10/1990 | Tsugane et al. | |
| 4,994,912 A | 2/1991 | Lumelsky et al. | |
| 5,003,532 A | 3/1991 | Ashida et al. | |
| 5,020,098 A | 5/1991 | Celli | |
| 5,136,652 A | 8/1992 | Jibbe et al. | |
| 5,187,571 A | 2/1993 | Braun et al. | |
| 5,200,818 A | 4/1993 | Neta et al. | |
| 5,249,035 A | 9/1993 | Yamanaka | |
| 5,255,211 A | 10/1993 | Redmond | |
| D341,848 S | 11/1993 | Bigelow et al. | |
| 5,268,734 A | 12/1993 | Parker et al. | |
| 5,317,405 A | 5/1994 | Kuriki et al. | |
| 5,337,363 A | 8/1994 | Platt | |
| 5,347,363 A | 9/1994 | Yamanaka | |
| 5,351,067 A | 9/1994 | Lumelsky et al. | |
| 5,359,362 A | 10/1994 | Lewis et al. | |
| D357,468 S | 4/1995 | Rodd | |
| 5,406,326 A | 4/1995 | Mowry | |
| 5,423,554 A | 6/1995 | Davis | |
| 5,446,834 A | 8/1995 | Deering | |
| 5,448,287 A | 9/1995 | Hull | |
| 5,467,401 A | 11/1995 | Nagamitsu et al. | |
| 5,495,576 A | 2/1996 | Ritchey | |
| 5,502,481 A | 3/1996 | Dentinger et al. | |
| 5,502,726 A | 3/1996 | Fischer | |
| 5,506,604 A | 4/1996 | Nally et al. | |
| 5,532,737 A | 7/1996 | Braun | |
| 5,541,639 A | 7/1996 | Takatsuki et al. | |
| 5,541,773 A | 7/1996 | Kamo et al. | |
| 5,570,372 A | 10/1996 | Shaffer | |
| 5,572,248 A | 11/1996 | Allen et al. | |
| 5,587,726 A | 12/1996 | Moffat | |
| 5,612,733 A | 3/1997 | Flohr | |
| 5,625,410 A | 4/1997 | Washino et al. | |
| 5,666,153 A | 9/1997 | Copeland | |
| 5,673,401 A | 9/1997 | Volk et al. | |
| 5,675,374 A | 10/1997 | Kohda | |
| 5,715,377 A | 2/1998 | Fukushima et al. | |
| D391,935 S | 3/1998 | Sakaguchi et al. | |
| D392,269 S | 3/1998 | Mason et al. | |
| 5,729,471 A | 3/1998 | Jain et al. | |
| 5,737,011 A | 4/1998 | Lukacs | |
| 5,748,121 A | 5/1998 | Romriell | |
| 5,760,826 A | 6/1998 | Nayar | |
| 5,790,182 A | 8/1998 | Hilaire | |
| 5,796,724 A | 8/1998 | Rajamani et al. | |
| 5,815,196 A | 9/1998 | Alshawi | |
| 5,818,514 A | 10/1998 | Duttweiler et al. | |
| 5,821,985 A | 10/1998 | Iizawa | |
| 5,889,499 A | 3/1999 | Nally et al. | |
| 5,894,321 A | 4/1999 | Downs et al. | |
| D410,447 S | 6/1999 | Chang | |
| 5,940,118 A | 8/1999 | Van Schyndel | |
| 5,940,530 A | 8/1999 | Fukushima et al. | |
| 5,953,052 A | 9/1999 | McNelley et al. | |
| 5,956,100 A | 9/1999 | Gorski | |
| 6,069,658 A | 5/2000 | Watanabe | |
| 6,088,045 A | 7/2000 | Lumelsky et al. | |
| 6,097,441 A | 8/2000 | Allport | |
| 6,101,113 A | 8/2000 | Paice | |
| 6,124,896 A | 9/2000 | Kurashige | |
| 6,148,092 A | 11/2000 | Qian | |
| 6,167,162 A | 12/2000 | Jacquin et al. | |
| 6,172,703 B1 | 1/2001 | Lee | |
| 6,173,069 B1 | 1/2001 | Daly et al. | |
| 6,226,035 B1 | 5/2001 | Korein et al. | |
| 6,243,130 B1 | 6/2001 | McNelley et al. | |
| 6,249,318 B1 | 6/2001 | Girod et al. | |
| 6,256,400 B1 | 7/2001 | Takata et al. | |
| 6,266,082 B1 | 7/2001 | Yonezawa et al. | |
| 6,266,098 B1 | 7/2001 | Cove et al. | |
| 6,285,392 B1 | 9/2001 | Satoda et al. | |
| 6,292,575 B1 | 9/2001 | Bortolussi et al. | |
| 6,356,589 B1 | 3/2002 | Gebler et al. | |
| 6,380,539 B1 | 4/2002 | Edgar | |
| 6,424,377 B1 | 7/2002 | Driscoll, Jr. | |
| 6,430,222 B1 | 8/2002 | Okada | |
| 6,459,451 B2 | 10/2002 | Driscoll et al. | |
| 6,462,767 B1 | 10/2002 | Obata et al. | |
| 6,493,032 B1 | 12/2002 | Wallerstein et al. | |
| 6,507,356 B1 | 1/2003 | Jackel et al. | |
| 6,573,904 B1 | 6/2003 | Chun et al. | |
| 6,577,333 B2 | 6/2003 | Tai et al. | |
| 6,583,808 B2 | 6/2003 | Boulanger et al. | |
| 6,590,603 B2 | 7/2003 | Sheldon et al. | |
| 6,591,314 B1 | 7/2003 | Colbath | |
| 6,593,955 B1 | 7/2003 | Falcon | |
| 6,593,956 B1 | 7/2003 | Potts et al. | |
| 6,611,281 B2 | 8/2003 | Strubbe | |
| 6,680,856 B2 | 1/2004 | Schreiber | |
| 6,693,663 B1 | 2/2004 | Harris | |
| 6,694,094 B2 | 2/2004 | Partynski et al. | |
| 6,704,048 B1 | 3/2004 | Malkin et al. | |
| 6,710,797 B1 | 3/2004 | McNelley et al. | |
| 6,751,106 B2 | 6/2004 | Zhang et al. | |
| D492,692 S | 7/2004 | Fallon et al. | |
| 6,763,226 B1 | 7/2004 | McZeal | |
| 6,768,722 B1 | 7/2004 | Katseff et al. | |
| 6,774,927 B1 | 8/2004 | Cohen et al. | |
| 6,795,108 B2 | 9/2004 | Jarboe et al. | |
| 6,795,558 B2 | 9/2004 | Matsuo et al. | |
| 6,798,834 B1 | 9/2004 | Murakami et al. | |
| 6,801,637 B2 | 10/2004 | Voronka et al. | |
| 6,806,898 B1 | 10/2004 | Toyama et al. | |
| 6,807,280 B1 | 10/2004 | Stroud et al. | |
| 6,831,653 B2 | 12/2004 | Kehlet et al. | |
| 6,844,990 B2 | 1/2005 | Artonne et al. | |
| 6,850,266 B1 | 2/2005 | Trinca | |
| 6,853,398 B2 | 2/2005 | Malzbender et al. | |
| 6,867,798 B1 | 3/2005 | Wada et al. | |
| 6,882,358 B1 | 4/2005 | Schuster et al. | |
| 6,888,358 B2 | 5/2005 | Lechner et al. | |
| 6,909,438 B1 | 6/2005 | White et al. | |
| 6,911,995 B2 | 6/2005 | Ivanov et al. | |
| 6,917,271 B2 | 7/2005 | Zhang et al. | |
| 6,922,718 B2 | 7/2005 | Chang | |
| 6,963,653 B1 | 11/2005 | Miles | |
| 6,980,526 B2 | 12/2005 | Jang et al. | |
| 6,985,178 B1 * | 1/2006 | Morita et al. | 348/211.3 |
| 6,989,754 B2 | 1/2006 | Kiscanin et al. | |
| 6,989,836 B2 | 1/2006 | Ramsey | |
| 6,989,856 B2 | 1/2006 | Firestone et al. | |
| 6,990,086 B1 | 1/2006 | Holur et al. | |
| 7,002,973 B2 | 2/2006 | MeLampy et al. | |
| 7,023,855 B2 | 4/2006 | Haumont et al. | |
| 7,028,092 B2 | 4/2006 | MeLampy et al. | |
| 7,031,311 B2 | 4/2006 | MeLampy et al. | |
| 7,043,528 B2 | 5/2006 | Schmitt et al. | |
| 7,046,862 B2 | 5/2006 | Ishizaka et al. | |
| 7,057,636 B1 | 6/2006 | Cohen-Solal et al. | |
| 7,057,662 B2 | 6/2006 | Malzbender | |
| 7,061,896 B2 | 6/2006 | Jabbari et al. | |
| 7,072,504 B2 | 7/2006 | Miyano et al. | |
| 7,072,833 B2 | 7/2006 | Rajan | |
| 7,080,157 B2 | 7/2006 | McCanne | |
| 7,092,002 B2 | 8/2006 | Ferren et al. | |
| 7,095,455 B2 | 8/2006 | Jordan et al. | |
| 7,111,045 B2 | 9/2006 | Kato et al. | |
| 7,126,627 B1 | 10/2006 | Lewis et al. | |
| 7,131,135 B1 | 10/2006 | Virag et al. | |
| 7,136,651 B2 | 11/2006 | Kalavade | |
| 7,139,767 B1 | 11/2006 | Taylor et al. | |
| D533,525 S | 12/2006 | Arie | |
| D533,852 S | 12/2006 | Ma | |
| D534,511 S | 1/2007 | Maeda et al. | |

(56) References Cited

U.S. PATENT DOCUMENTS

| | | |
|---|---|---|
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| 7,197,008 B1 | 3/2007 | Shabtay et al. |
| D541,773 S | 5/2007 | Chong et al. |
| D542,247 S | 5/2007 | Kinoshita et al. |
| 7,221,260 B2 | 5/2007 | Berezowski et al. |
| D545,314 S | 6/2007 | Kim |
| 7,239,338 B2 | 7/2007 | Krisbergh et al. |
| 7,246,118 B2 | 7/2007 | Chastain et al. |
| D550,635 S | 9/2007 | DeMaio et al. |
| D551,184 S | 9/2007 | Kanou et al. |
| 7,269,292 B2 | 9/2007 | Steinberg |
| 7,274,555 B2 | 9/2007 | Kim et al. |
| D555,610 S | 11/2007 | Yang et al. |
| D559,265 S | 1/2008 | Armstrong et al. |
| D560,681 S | 1/2008 | Fletcher |
| D561,130 S | 2/2008 | Won et al. |
| 7,336,299 B2 | 2/2008 | Kostrzewski et al. |
| D567,202 S | 4/2008 | Rieu Piquet |
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,450,134 B2 | 11/2008 | Maynard et al. |
| 7,471,320 B2 | 12/2008 | Malkin et al. |
| 7,477,657 B1 | 1/2009 | Murphy et al. |
| D588,560 S | 3/2009 | Mellingen et al. |
| 7,505,036 B1 | 3/2009 | Baldwin |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| 7,577,246 B2 | 8/2009 | Idan et al. |
| D602,453 S | 10/2009 | Ding et al. |
| 7,607,101 B1 | 10/2009 | Barrus |
| 7,616,226 B2 | 11/2009 | Roessler et al. |
| 7,620,202 B2 | 11/2009 | Fujimura et al. |
| 7,623,115 B2 | 11/2009 | Marks |
| 7,646,419 B2 | 1/2010 | Cernasov |
| D610,560 S | 2/2010 | Chen |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,716,283 B2 | 5/2010 | Thukral |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| 7,738,457 B2 | 6/2010 | Nordmark et al. |
| D626,102 S | 10/2010 | Buzzard et al. |
| D626,103 S | 10/2010 | Buzzard et al. |
| 7,813,724 B2 | 10/2010 | Gronner et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| 7,889,851 B2 | 2/2011 | Shah et al. |
| 7,894,531 B1 | 2/2011 | Cetin et al. |
| 7,899,265 B1 | 3/2011 | Rostami |
| D635,569 S | 4/2011 | Park |
| D635,975 S | 4/2011 | Seo et al. |
| D636,359 S | 4/2011 | Buzzard et al. |
| D636,747 S | 4/2011 | Buzzard et al. |
| 7,920,158 B1 | 4/2011 | Beck et al. |
| D637,568 S | 5/2011 | Desai et al. |
| D637,569 S | 5/2011 | Desai et al. |
| D637,570 S | 5/2011 | Desai et al. |
| 7,939,959 B2 | 5/2011 | Wagoner |
| 7,990,422 B2 | 8/2011 | Ahiska et al. |
| 8,000,559 B2 | 8/2011 | Kwon |
| 8,031,906 B2 | 10/2011 | Fujimura et al. |
| 8,077,857 B1 | 12/2011 | Lambert |
| 8,081,346 B1 | 12/2011 | Anup et al. |
| 8,086,076 B2 | 12/2011 | Tian et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| D669,086 S | 10/2012 | Boyer et al. |
| D669,088 S | 10/2012 | Boyer et al. |
| 8,289,363 B2 | 10/2012 | Buckler |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,374,456 B2 | 2/2013 | Vetro et al. |
| 8,436,888 B1 | 5/2013 | Baldino et al. |
| 8,588,758 B2 | 11/2013 | Ullrich |
| 8,614,735 B2 | 12/2013 | Buckler |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2003/0220971 A1 | 11/2003 | Kressin |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0131261 A1* | 7/2004 | Lee et al. .................. 382/232 |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |

(56) References Cited

U.S. PATENT DOCUMENTS

| | | |
|---|---|---|
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0126894 A1 | 6/2006 | Mori |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0159523 A1 | 7/2007 | Hillis et al. |
| 2007/0183661 A1 | 8/2007 | El-Maleh et al. |
| 2007/0188597 A1 | 8/2007 | Kenoyer |
| 2007/0189219 A1 | 8/2007 | Navoli et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0211716 A1 | 9/2007 | Oz et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0068446 A1 | 3/2008 | Barkley et al. |
| 2008/0069444 A1 | 3/2008 | Wilensky |
| 2008/0077390 A1 | 3/2008 | Nagao |
| 2008/0084429 A1 | 4/2008 | Wissinger |
| 2008/0136896 A1 | 6/2008 | Graham et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0267282 A1 | 10/2008 | Kalipatnapu et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0003723 A1 | 1/2009 | Kokemohr |
| 2009/0009593 A1 | 1/2009 | Cameron et al. |
| 2009/0051756 A1 | 2/2009 | Trachtenberg |
| 2009/0079812 A1 | 3/2009 | Crenshaw et al. |
| 2009/0096573 A1 | 4/2009 | Graessley |
| 2009/0115723 A1 | 5/2009 | Henty |
| 2009/0122867 A1 | 5/2009 | Mauchly et al. |
| 2009/0129753 A1 | 5/2009 | Wagenlander |
| 2009/0147070 A1 | 6/2009 | Marathe et al. |
| 2009/0174764 A1 | 7/2009 | Chadha et al. |
| 2009/0193345 A1 | 7/2009 | Wensley et al. |
| 2009/0207179 A1 | 8/2009 | Huang et al. |
| 2009/0207233 A1 | 8/2009 | Mauchly et al. |
| 2009/0207234 A1 | 8/2009 | Chen et al. |
| 2009/0244257 A1 | 10/2009 | MacDonald et al. |
| 2009/0256901 A1 | 10/2009 | Mauchly et al. |
| 2009/0279476 A1 | 11/2009 | Li et al. |
| 2009/0322082 A1 | 12/2009 | Wagoner |
| 2009/0324008 A1 | 12/2009 | Kongqiao et al. |
| 2009/0324023 A1 | 12/2009 | Tian et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0042281 A1 | 2/2010 | Filla |
| 2010/0079355 A1 | 4/2010 | Kilpatrick et al. |
| 2010/0082557 A1 | 4/2010 | Gao et al. |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0158387 A1 | 6/2010 | Choi et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0208078 A1 | 8/2010 | Tian et al. |
| 2010/0225732 A1 | 9/2010 | De Beer et al. |
| 2010/0225735 A1 | 9/2010 | Shaffer et al. |
| 2010/0241845 A1 | 9/2010 | Alonso |
| 2010/0259619 A1 | 10/2010 | Nicholson |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0302345 A1 | 12/2010 | Baldino et al. |
| 2010/0316232 A1 | 12/2010 | Acero et al. |
| 2010/0329511 A1 | 12/2010 | Yoon et al. |
| 2011/0008017 A1 | 1/2011 | Gausereide |
| 2011/0032368 A1* | 2/2011 | Pelling ............... 348/211.9 |
| 2011/0037636 A1 | 2/2011 | Alexander |
| 2011/0039506 A1 | 2/2011 | Lindahl et al. |
| 2011/0063440 A1 | 3/2011 | Neustaedter et al. |
| 2011/0063467 A1 | 3/2011 | Tanaka |
| 2011/0085016 A1 | 4/2011 | Kristiansen et al. |
| 2011/0090303 A1 | 4/2011 | Wu et al. |
| 2011/0105220 A1 | 5/2011 | Hill et al. |
| 2011/0109642 A1 | 5/2011 | Chang et al. |
| 2011/0193982 A1* | 8/2011 | Kook et al. ............ 348/222.1 |
| 2011/0242266 A1 | 10/2011 | Blackburn et al. |
| 2011/0249086 A1 | 10/2011 | Guo et al. |
| 2011/0276901 A1 | 11/2011 | Zambetti et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |
| 2013/0088565 A1 | 4/2013 | Buckler |

(56) References Cited

U.S. PATENT DOCUMENTS

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1768058 A2 | 3/2007 |
| EP | 2073543 A1 | 6/2009 |
| EP | 2255531 | 12/2010 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO2008/010929 | 1/2008 |
| WO | WO2008/039371 | 4/2008 |
| WO | WO 2008/040258 | 4/2008 |
| WO | WO 2008/101117 | 8/2008 |
| WO | WO 2008/118887 | 10/2008 |
| WO | WO2009/088976 | 7/2009 |
| WO | WO 2009/102503 | 8/2009 |
| WO | WO 2009/120814 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |
| WO | WO2012/068008 | 5/2012 |
| WO | WO2012/068010 | 5/2012 |
| WO | WO2012/068485 | 5/2012 |
| WO | WO2013/096041 | 6/2013 |

OTHER PUBLICATIONS

"Cisco Expo Germany 2009 Opening," Posted on YouTube on May 4, 2009; http://www.youtube.com/watch?v=SDKsaS1z4MK; 2 pages.
"Eye Tracking," from Wikipedia, (printed on Aug. 31, 2011) 12 pages; http://en.wikipedia.org/wiki/Eye_tracker.
"Infrared Cameras TVS-200-EX," [retrieved and printed on May 24, 2010] http://www.electrophysics.com/Browse/Brw_ProductLineCategory.asp?CategoryID=184&Area=IS; 2 pages.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
"Vocative Case," from Wikipedia, [retrieved and printed on Mar. 3, 2011] 11 pages; http://en.wikipedia.org/wiki/Vocative_case.
"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.
"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.
"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.
"Simple Hand Gesture Recognition," video clip, YouTube, posted Aug. 25, 2008 by pooh8210, 1 page; http://www.youtube.com/watch?v=F8GVeVOdYLM&feature=related.

PCT May 30, 2013 International Preliminary Report on Patentability and Written Opinion from the International Searching Authority for International Application Serial No. PCT/US2011/061442 8 pages.
PCT May 30, 2013 International Preliminary Report on Patentability and Written Opinion from the International Searching Authority for International Application Serial No. PCT/US2011/060579 6 pages.
PCT May 30, 2013 International Preliminary Report on Patentability and Written Opinion from the International Searching Authority for International Application Serial No. PCT/US2011/060584 7 pages.
PRC Jun. 18, 2013 Response to SIPO Second Office Action from Chinese Application No. 200980119121.5; 5 pages.
U.S. Appl. No. 13/329,943, filed Dec. 19, 2011 entitled "System and Method for Depth-Guided Image Filtering in a Video Conference Environment," Inventor: Dihong Tian.
U.S. Appl. No. 13/707,377, filed Dec. 12, 2012 entitled "System and Method for Depth-Guided Image Filtering in a Video Conference Environment," Inventor: Dihong Tian.
USPTO May 24, 2013 Non-Final Office Action from U.S. Appl. No. 13/329,943.
USPTO Aug. 24, 2013 Response to May 24, 2013 Non-Final Office Action from U.S. Appl. No. 13/329,943.
USPTO Sep. 19, 2013 Notice of Allowance from U.S. Appl. No. 13/329,943.
PCT Mar. 14, 2013 International Search Report and Written Opinion from International Application PCT/US2012/069111.
Kim, Jae Hoon et al., "New Coding Tools for Illumination and Focus Mismatch Compensation in Multiview Video Coding," IEEE Transactions on Circuits and Systems for Video Technology, IEEE Service Center, Piscataway, NJ, US. vol. 17, No. 11, Nov. 1, 2007; 17 pages.
Hong, Min-Cheol, et al., "A Reduced Complexity Loop Filter Using Coded Block Pattern and Quantization Step Size for H.26L Video Coder," International Conference on Consumer Electronics, 2001 Digest of Technical Papers, ICCE, Los Angelos, CA, Jun. 19-21, 2001; 2 pages.
PRC Jul. 9, 2013 SIPO Third Office Action from Chinese Application No. 200980119121.5; 15 pages.
PRC Sep. 24, 2013 Response to SIPO Third Office Action from Chinese Application No. 200980119121.5; 5 pages.
EPO Feb. 25, 2011 Communication for EP09725288.6 (published as EP22777308); 4 pages.
EPO Aug. 15, 2011 Response to EPO Communication mailed Feb. 25, 2011 from European Patent Application No. 09725288.6; 15 pages.
EPO Nov. 3, 2011 Communication from European Application EP10710949.8; 2 pages.
EPO Mar. 12, 2012 Response to EP Communication dated Nov. 3, 2011 from European Application EP10710949.8; 15 pages.
EPO Mar. 20, 2012 Communication from European Application 09725288.6; 6 pages.
EPO Jul. 10, 2012 Response to EP Communication from European Application EP10723445.2.
EPO Sep. 24, 2012 Response to Mar. 20, 2012 EP Communication from European Application EP09725288.6.
PCT May 15, 2006 International Report of Patentability dated May 15, 2006, for PCT International Application PCT/US2004/021585, 6 pages.
PCT Sep. 25, 2007 Notification of Transmittal of the International Search Report from PCT/US06/45895.
PCT Sep. 2, 2008 International Preliminary Report on Patentability (1 page) and the Written Opinion of th ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT Feb. 23, 2010 PCT Notification of Transmittal of the International Search Report and the Written Opinion of the International Searching Authority, or the Declaration for PCT/US2009/064061 mailed Feb. 23, 2010; 14 pages.
PCT Aug. 24, 2010 PCT International Search Report mailed Aug. 24, 2010 for PCT/US2010033880; 4 pages.

(56) References Cited

OTHER PUBLICATIONS

PCT Aug. 26, 2010 International Preliminary Report on Patentability mailed Aug. 26, 2010 for PCT/US2009/001070; 10 pages.
PCT Oct. 12, 2011 International Search Report and Written Opinion of the ISA from PCT/US2011/050380.
PCT Nov. 24, 2011 International Preliminary Report on Patentability from International Application Serial No. PCT/US2010/033880; 6 pages.
PCT Aug. 23, 2011 International Preliminary Report on Patentability and Written Opinion of the ISA from PCT/US2010/024059; 6 pages.
PCT Sep. 13, 2011 International Preliminary Report on Patentability and the Written Opinion of the ISA from PCT/US2010/026456; 5 pages.
PCT Jan. 23, 2012 International Search Report and Written Opinion of the ISA from International Application Serial No. PCT/US2011/060579; 10 pages.
PCT Jan. 23, 2012 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
PCT Mar. 21, 2013 International Preliminary Report on Patentability from International Application Serial No. PCT/US2011/050380.
Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.
Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.
Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.
Radhika, N., et al., "Mobile Dynamic reconfigurable Context aware middleware for Adhoc smart spaces," Academic Open Internet Journal, ISSN 1311-4360, vol. 22, 2008; 3 pages http://www.acadjournal.com/2008/V22/part6/p7.
Rayvel Business-to-Business Products, copyright 2004 [retrieved and printed on Feb. 24, 2009], http://www.rayvel.com/b2b.html; 2 pages.
Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.
Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.
Rikert, T.D., et al., "Gaze Estimation using Morphable models," IEEE International Conference on Automatic Face and Gesture Recognition, Apr. 1998; 7 pgs. http://citeseer.ist.psu.edu/viewdoc/summary?doi=10.1.1.30.9472.
Butler, Darren, et al., "Robust Face Localisation Using Motion, Colour & Fusion" ; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.
Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.
School of Computing, "Bluetooth over IP for Mobile Phones," 2005; http://www.computing.dcuie/wwwadmin/fyp-abstract/list/fyp_details05.jsp?year=2005&number=51470574; 1 page.
Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.
Sena, "Industrial Bluetooth," [retrieved and printed on Apr. 22, 2009] http://www.sena.com/products/industrial_bluetooth; 1 page.
Shaffer, Shmuel, "Translation—State of the Art" presentation; Jan. 15, 2009; 22 pages.
Shi, C. et al., "Automatic Image Quality Improvement for Videoconferencing," IEEE ICASSP May 2004; http://research.microsoft.com/pubs/69079/0300701.pdf; 4 pages.
Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.
Smarthome, "IR Extender Expands Your IR Capabilities," [retrieved and printed on Apr. 22, 2009], http://www.smarthome.com/8121.html; 3 pages.
Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.
Sonoma Wireworks Forums, "Jammin on Rifflink," [retrieved and printed on May 27, 2010] http://www.sonomawireworks.com/forums/viewtopic.php?id=2659; 5 pages.
Sonoma Wireworks Rifflink, [retrieved and printed on Jun. 2, 2010] http://www.sonomawireworks.com/rifflink.php; 3 pages.
Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE—Int. Soc. Opt. Eng USA ISSN: 0277-786X; XP007905596; pp. 78-88.
Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.
Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.
Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.
Super Home Inspectors or Super Inspectors, [retrieved and printed on Mar. 18, 2010] http://www.umrt.com/PageManager/Default.aspx/PageID=2120325; 3 pages.
Tan, Kar-Han, et al., "Appearance-Based Eye Gaze Estimation," In Proceedings IEEE WACV'02, 2002, 5 pages; http://citeseer.ist.psu.edu/viewdoc/summary?doi=10.1.1.19.8921.
Total immersion, Video Gallery, copyright 2008-2009 [retrieved and printed on Feb. 26, 2009], http://www.t-immersion.com/en,video-gallery,36.html, 1 page.
Trucco, E., et al., "Real-Time Disparity Maps for Immersive 3-D Teleconferencing by Hybrid Recursive Matching and Census Transform," [retrieved and printed on May 4, 2010] http://server.cs.ucf.edu/~vision/papers/VidReg-final.pdf; 9 pages.
Tsapatsoulis, N., et al., "Face Detection for Multimedia Applications," Proceedings of the ICIP Sep. 10-13, 2000, Vancouver, BC, Canada; vol. 2, pp. 247-250.
Tsapatsoulis, N., et al., "Face Detection in Color Images and Video Sequences," 10th Mediterranean Electrotechnical Conference (MELECON), May 29-31, 2000; vol. 2; pp. 498-502.
Veratech Corp., "Phantom Sentinel," © VeratechAero 2006, 1 page; http://www.veratechcorp.com/phantom.html.
Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.
Wachs, J., et al., "A Real-time Hand Gesture System Based on Evolutionary Search," Vision, $3^{rd}$ Quarter 2006, vol. 22, No. 3, 18 pages; http://web.ics.purdue.edu/~jpwachs/papers/3q06vi.pdf.

(56) References Cited

OTHER PUBLICATIONS

Wang, Hualu, et al., "A Highly Efficient System for Automatic Face Region Detection inMPEG Video," IEEE Transactions on Circuits and Systems for Video Technology; vol. 7, Issue 4; 1977 pp. 615-628.
Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.
Wang, Robert and Jovan Popovic, "Desktop virtual reality," video clip, YouTube, posted by rkeltset on Apr. 8, 2010, 1 page; http://www.youtube.com/watch?v=9rBtm62Lkfk.
Wang, Robert and Jovan Popovic, "Gestural user input," video clip, YouTube, posted by rkeltset on May 19, 2010, 1 page; http://www.youtube.com/watch?v=3JWYTtBjdTE.
Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.
Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.
Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mitedu/rywang/handtracking/s09-hand-tracking.pdf.
Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.
Weinstein et al., "Emerging Technologies for Teleconferencing and Telepresence," Wainhouse Research 2005; http://www.ivci.com/pdf/whitepaper-emerging-technologies-for-teleconferencing-and-telepresence.pdf.
Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.
Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.
Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.
Wi-Fi Protected Setup, from Wikipedia, Sep. 2, 2010, 3 pages http://en.wikipedia.org/wiki/Wi-Fi_Protected_Setup.
Wilson, Mark, "Dreamoc 3D Display Turns Any Phone Into Hologram Machine," Oct. 30, 2008; http://gizmodo.com/5070906/dreamoc-3d-display-turns-any-phone-into-hologram-machine; 2 pages.
WirelessDevNet, Melody Launches Bluetooth Over IP, [retrieved and printed on Jun. 5, 2010] http://www.wirelessdevnet.com/news/2001/155/news5.html; 2 pages.
Xia, F., et al., "Home Agent Initiated Flow Binding for Mobile IPv6," Network Working Group, Oct. 19, 2009, 15 pages; http://toolsietf.orghtml/draft-xia-mext-ha-init-flow-binding-01.txt.
Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.
Yang, Jie, et al., "A Real-Time Face Tracker," Proceedings 3rd IEEE Workshop on Applications of Computer Vision; 1996; Dec. 2-4, 1996; pp. 142-147; http://www.ri.cmu.edu/pub_files/pub1/yang_jie_1996_1/yang_jie_1996_1.pdf.
Yang, Ming-Hsuan, et al., "Detecting Faces in Images: A Survey," vol. 24, No. 1; Jan. 2002; pp. 34-58; http://vision.ai.uiuc.edu/mhyang/papers/pami02a.pdf.
Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf ; 10 pgs.
Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.
Yegani, P. et al., "GRE Key Extension for Mobile IPv4," Network Working Group, Feb. 2006, 11 pages; http://tools.ietf.org/pdf/draft-yegani-gre-key-extension-01.pdf.
Yoo, Byounghun, et al., "Image-Based Modeling of Urban Buildings Using Aerial Photographs and Digital Maps," Transactions in GIS, 2006, 10(3): p. 377-394.
Zhong, Ren, et al., "Integration of Mobile IP and MPLS," Network Working Group, Jul. 2000, 15 pages; http://tools.ietf.org/html/draft-zhong-mobile-ip-mpls-01.
PRC Aug. 3, 2012 SIPO First Office Action from Chinese Application No. 200980119121.5; 16 pages.
PRC Dec. 18, 2012 Response to SIPO First Office Action from Chinese Application No. 200980119121.5; 16 pages.
PRC Jan. 7, 2013 SIPO Second Office Action from Chinese Application Serial No. 200980105262.1.
"Oblong Industries is the developer of the g-speak spatial operation environment," Oblong Industries Information Page, 2 pages, [Retrieved and printed on Dec. 1, 2010] http://oblong.com.
Underkoffler, John, "G-Speak Overview 1828121108," video clip, Vimeo.com, 1 page, [Retrieved and printed on Dec. 1, 2010] http://vimeo.com/2229299.
Kramer, Kwindla, "Mary Ann de Lares Norris at Thinking Digital," Oblong Industries, Inc. Web Log, Aug. 24, 2010; 1 page; http://oblong.com/articles/OBS6hEeJmoHoCwgJ.html.
"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.
Kramer, Kwindla, "Oblong at TED," Oblong Industries, Inc. Web Log, Jun. 6, 2010, 1 page; http://oblong.com/article/OB22LFIS1NVyrOmR.html.
Kramer, Kwindla, "Oblong on Bloomberg TV," Oblong Industries, Inc. Web Log, Jan. 28, 2010, 1 page; http://oblong.com/article/0AN_1KD9q990PEnw.html.
Kramer, Kwindla, "g-speak at RISD, Fall 2009," Oblong Industries, Inc. Web Log, Oct. 29, 2009, 1 page; http://oblong.com/article/09uW060q6xRIZYvm.html.
Kramer, Kwindla, "g-speak+TMG," Oblong Industries, Inc. Web Log, Mar. 24, 2009, 1 page; http://oblong.com/article/08mM77zpYMm7kFtv.html.
"g-stalt version 1," video clip, YouTube.com, posted by zigg1es on Mar. 15, 2009, 1 page; http://youtube.com/watch?v=k8ZAql4mdvk.
Underkoffler, John, "Carlton Sparrell speaks at MIT," Oblong Industries, Inc. Web Log, Oct. 30, 2009, 1 page; http://oblong.com/article/09usAB411Ukb6CPw.html.
Underkoffler, John, "Carlton Sparrell at MIT Media Lab," video clip, Vimeo.com, 1 page, [Retrieved and printed Dec. 1, 2010] http://vimeo.com/7355992.
Underkoffler, John, "Oblong at Altitude: Sundance 2009," Oblong Industries, Inc. Web Log, Jan. 20, 2009, 1 page; http://oblong.com/article/08Sr62ron_2akg0D.html.
Underkoffler, John, "Oblong's tamper system 1801011309," video clip, Vimeo.com, 1 page, [Retrieved and printed Dec. 1, 2010] http://vimeo.com/2821182.
Feld, Brad, "Science Fact," Oblong Industries, Inc. Web Log, Nov. 13, 2008, 2 pages,http://oblong.com/article/084H-PKI5Tb9I4Ti.html.
Kwindla Kramer, "g-speak in slices," Oblong Industries, Inc. Web Log, Nov. 13, 2008, 6 pages; http://oblong.com/article/0866JqfNrFg1NeuK.html.
Underkoffler, John, "Origins: arriving here," Oblong Industries, Inc. Web Log, Nov. 13, 2008, 5 pages; http://oblong.com/article/085zBpRSY9JeLv2z.html.

(56) References Cited

OTHER PUBLICATIONS

Rishel, Christian, "Commercial overview: Platform and Products," Oblong Industries, Inc., Nov. 13, 2008, 3 pages; http://oblong.com/article/086E19gPvDcktA19.html.
active8-3D—Holographic Projection—3D Hologram Retail Display & Video Project, [retrieved and printed on Feb. 24, 2009], http://www.activ8-3d.co.uk/3d_holocubes; 1 page.
Andersson, L., et al., "LDP Specification," Network Working Group, RFC 3036, Jan. 2001, 133 pages; http://tools.ietf.org/html/rfc3036.
Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.
Arrington, Michael, "eJamming—Distributed Jamming," TechCrunch; Mar. 16, 2006; http://www.techcrunch.com/2006/03/16/ejamming-distributed-jamming/; 1 page.
Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages; http://www.cs.ubc.ca/~murphyk/Software/Kalman/ParticleFilterTutorial.pdf.
Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.
Awduche, D., et al., "Requirements for Traffic Engineering over MPLS," Network Working Group, RFC 2702, Sep. 1999, 30 pages; http://tools.ietf.org/pdf/rfc2702.pdf.
Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.
Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.
Berzin, O., et al., "Mobility Support Using MPLS and MP-BGP Signaling," Network Working Group, Apr. 28, 2008, 60 pages; http://www.potaroo.net/ietf/al1-/draft-berzin-malis-mpls-mobility-01.txt.
Boccaccio, Jeff; CEPro, "Inside HDMI CEC: The Little-Known Control Feature," Dec. 28, 2007; http://www.cepro.com/article/print/inside_hdmi_cec_the_little_known_control_feature; 2 pages.
Boros, S., "Policy-Based Network Management with SNMP," Proceedings of the EUNICE 2000 Summer School Sep. 13-15, 2000, p. 3.
Bücken R: "Bildfernsprechen: Videokonferenz vom Arbeitsplatz aus" Funkschau, Weka Fachzeitschriften Verlag, Poing, De, No. 17, Aug. 14, 1986, pp. 41-43, XP002537729; ISSN: 0016-2841, p. 43, left-hand column, line 34-middle column, line 24.
Chan, Eric, et al., "Experiments on block-matching techniques for video coding," Multimedia Systems; 9 Springer-Verlag 1994, Multimedia Systems (1994) 2 pp. 228-241.
Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.
Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.
Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.

Chien et al., "Efficient moving Object Segmentation Algorithm Using Background Registration Technique," IEEE Transactions on Circuits and Systems for Video Technology, vol. 12, No. 7, Jul. 2002, 10 pages.
Cisco: Bill Mauchly and Mod Marathe; UNC: Henry Fuchs, et al., "Depth-Dependent Perspective Rendering," Apr. 15, 2008; 6 pages.
Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; ©2004 Hindawi Publishing Corp.; XP002536356; ISSN: 1110-8657; pp. 1899-1911; http://downloads.hindawi.com/journals/asp/2004/470826.pdf.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.
Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.
Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.
Diaz, Jesus, iPhone Bluetooth File Transfer Coming Soon (YES!); Jan. 26, 2009; http://i.gizmodo.com/5138797/iphone-bluetooth-file-transfer-coming-soon-yes; 1page.
Dornaika F., et al., "Head and Facial Animation Tracking Using Appearance-Adaptive Models and Particle Filters," 20040627; 20040627-20040602, Jun. 27, 2004, 22 pages; Heudiasy Research Lab, http://eprints.pascal-network.org/archive/00001231/01/rtvhci_chapter8.pdf.
DVE Digital Video Enterprises, "DVE Tele-Immersion Room," [retrieved and printed on Feb. 5, 2009] http://www.dvetelepresence.com/products/immersion_room.asp; 2 pages.
Dynamic Displays, copyright 2005-2008 [retrieved and printed on Feb. 24, 2009] http://www.zebraimaging.com/html/lighting_display.html, 2 pages.
ECmag.com, "IBS Products," Published Apr. 2009; http://www.ecmag.com/index.cfm?fa=article&articleID=10065; 2 pages.
Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.
eJamming Audio, Learn More; [retrieved and printed on May 27, 2010] http://www.ejamming.com/learnmore/; 4 pages.
Electrophysics Glossary, "Infrared Cameras, Thermal Imaging, Night Vision, Roof Moisture Detection," [retrieved and printed on Mar. 18, 2010] http://www.electrophysics.com/Browse/Brw_Glossary.asp; 11 pages.
Farrukh, A., et al., Automated Segmentation of Skin-Tone Regions in Video Sequences, Proceedings IEEE Students Conference, ISCON_apos_02; Aug. 16-17, 2002; pp. 122-128.
Fiala, Mark, "Automatic Projector Calibration Using Self-Identifying Patterns," National Research Council of Canada, Jun. 20-26, 2005; http://www.procams.org/procams2005/papers/procams05-36.pdf; 6 pages.
Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.
Freeman, Professor Wilson T., Computer Vision Lecture Slides, "6.869 Advances in Computer Vision: Learning and Interfaces," Spring 2005; 21 pages.

(56) References Cited

OTHER PUBLICATIONS

Garg, Ashutosh, et al., "Audio-Visual lSpeaker Detection Using Dynamic Bayesian Networks," IEEE International Conference on Automatic Face and Gesture Recognition, 2000 Proceedings, 7 pages; http://www.ifp.illinois.edu/~ashutosh/papers/FG00.pdf.

Gemmell, Jim, et al., "Gaze Awareness for Video-conferencing: A Software Approach," IEEE MultiMedia, Oct.-Dec. 2000; vol. 7, No. 4, pp. 26-35.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.

Gries, Dan, "3D Particles Experiments in AS3 and Flash CS3, Dan's Comments," [retrieved and printed on May 24, 2010] http://www.flashandmath.com/advanced/fourparticles/notes.html; 3 pages.

Guernsey, Lisa, "Toward Better Communication Across the Language Barrier," Jul. 29, 1999; http://www.nytimes.com/1999/07/29/technology/toward-better-communication-across-the-language-barrier.html; 2 pages.

Guili, D., et al., "Orchestra!: A Distributed Platform for Virtual Musical Groups and Music Distance Learning over the Internet in JavaTM Technology" ; [retrieved and printed on Jun. 6, 2010] http://ieeexplore.ieee.org/stamp/stamp.jsp?tp=&arnumber=778626; 2 pages.

Gundavelli, S., et al., "Proxy Mobile IPv6," Network Working Group, RFC 5213, Aug. 2008, 93 pages; http://tools.ietf.org/pdf/rfc5213.pdf.

Gussenhoven, Carlos, "Chapter 5 Transcription of Dutch Intonation," Nov. 9, 2003, 33 pages; http://www.ru.nl/publish/pages/516003/todisun-ah.pdf.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.

Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

He, L., et al., "The Virtual Cinematographer: A Paradigm for Automatic Real-Time Camera Control and Directing," Proc. SIGGRAPH, ©1996; http://research.microsoft.com/en-us/um/people/lhe/papers/siggraph96.vc.pdf; 8 pages.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.

Holographic Imaging, "Dynamic Holography for scientific uses, military heads up display and even someday HoloTV Using TI's DMD," [retrieved and printed on Feb. 26, 2009] http://innovation.swmed.edu/ research/instrumentation/res_inst_dev3d.html; 5 pages.

Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.

IR Distribution Category @ Envious Technology, "IR Distribution Category," [retrieved and printed on Apr. 22, 2009] http://www.envioustechnology.com.au/ products/product-list.php?CID=305; 2 pages.

IR Trans—Products and Orders—Ethernet Devices, [retrieved and printed on Apr. 22, 2009] http://www.irtrans.de/en/shop/lan.php; 2 pages.

Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.

Itoh, Hiroyasu, et al., "Use of a gain modulating framing camera for time-resolved imaging of cellular phenomena," SPIE vol. 2979, 1997, pp. 733-740.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.

Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.

Keijser, Jeroen, et al., "Exploring 3D Interaction in Alternate Control-Display Space Mappings," IEEE Symposium on 3D User Interfaces, Mar. 10-11, 2007, pp. 17-24.

Kim, Y.H., et al., "Adaptive mode decision for H.264 encoder," Electronics letters, vol. 40, Issue 19, pp. 1172-1173, Sep. 2004; 2 pages.

Klint, Josh, "Deferred Rendering in Leadwerks Engine," Copyright Leadwerks Corporation © 2008; http://www.leadwerks.com/files/Deferred_Rendering_in_Leadwerks_Engine.pdf; 10 pages.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba721db14d26dfccc6b4701/1291487062/3143800.pdf.

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.

Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].

Lambert, "Polycom Video Communications," ©2004 Polycom, Inc., Jun. 20, 2004 http://www.polycom.com/global/documents/whitepapers/video_communications_h.239_people_content_polycom_patented_technology.pdf.

(56) References Cited

OTHER PUBLICATIONS

Lawson, S., "Cisco Plans TelePresence Translation Next Year," Dec. 9, 2008; http://www.pcworld.com/ article/155237/.html?tk=rss_news; 2 pages.

Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.

Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNIcrI.

Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/ Publications/miller05cvmp.pdf, 10 pages.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Minoru from Novo is the worlds first consumer 3D Webcam, Dec. 11, 2008; http://www.minoru3d.com; 4 pages.

Mitsubishi Electric Research Laboratories, copyright 2009 [retrieved and printed on Feb. 26, 2009], http://www.merl.com/projects/3dtv, 2 pages.

Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.

National Training Systems Association Home—Main, Interservice/Industry Training, Simulation & Education Conference, Dec. 1-4, 2008; http://ntsa.metapress.com/app/home/main.asp?referrer=default; 1 page.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

Opera Over Cisco TelePresence at Cisco Expo 2009, in Hannover Germany—Apr. 28, 29, posted on YouTube on May 5, 2009; http://www.youtube.com/watch?v=xN5jNH5E-38; 1 page.

OptoIQ, "Vision + Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.

OptoIQ, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnIOptoLFWJanuary132010.html; 2 pages.

OptoIQ, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.

OptoIQ, "Vision Systems Design—Machine Vision and Image Processing Technology," [retrieved and printed on Mar. 18, 2010], http://www.optoiq.com/index/machine-vision-imaging-processing.html; 2 pages.

Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.

Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.

U.S. Appl. No. 12/366,593, filed Feb. 5, 2009, entitled "System and Method for Depth Perspective Image Rendering," Inventor(s): J. William Mauchly et al.

U.S. Appl. No. 12/727,089, filed Mar. 18, 2010, entitled "System and Method for Enhancing Video Images in a Conferencing Environment," Inventor: Joseph T. Friel.

U.S. Appl. No. 12/781,722, filed May 17, 2010, entitled "System and Method for Providing Retracting Optics in a Video Conferencing Environment," Inventor(s): Joseph T. Friel, et al.

U.S. Appl. No. 12/877,833, filed Sep. 8, 2010, entitled "System and Method for Skip Coding During Video Conferencing in a Network Environment," Inventor[s]: Dihong Tian, et al.

U.S. Appl. No. 12/870,687, filed Aug. 27, 2010, entitled "System and Method for Producing a Performance Via Video Conferencing in a Network Environment," Inventor(s): Michael A. Arnao et al.

U.S. Appl. No. 12/912,556, filed Oct. 26, 2010, entitled "System and Method for Provisioning Flows in a Mobile Network Environment," Inventors: Balaji Vankat Vankataswami, et al.

U.S. Appl. No. 12/949,614, filed Nov. 18, 2010, entitled "System and Method for Managing Optics in a Video Environment," Inventors: Torence Lu, et al.

U.S. Appl. No. 12/873,100, filed Aug. 31, 2010, entitled "System and Method for Providing Depth Adaptive Video Conferencing," Inventor(s): J. William Mauchly et al.

U.S. Appl. No. 12/946,679, filed Nov. 15, 2010, entitled "System and Method for Providing Camera Functions in a Video Environment," Inventors: Peter A.J. Fornell, et al.

U.S. Appl. No. 12/946,695, filed Nov. 15, 2010, entitled "System and Method for Providing Enhanced Audio in a Video Environment," Inventors: Wei Li, et al.

U.S. Appl. No. 12/907,914, filed Oct. 19, 2010, entitled "System and Method for Providing Videomail in a Network Environment," Inventors: David J. Mackie et al.

U.S. Appl. No. 12/950,786, filed Nov. 19, 2010, entitled "System and Method for Providing Enhanced Video Processing in a Network Environment," Inventor[s]: David J. Mackie.

U.S. Appl. No. 12/907,919, filed Oct. 19, 2010, entitled "System and Method for Providing Connectivity in a Network Environment," Inventors: David J. Mackie et al.

U.S. Appl. No. 12/946,704, filed Nov. 15, 2010, entitled "System and Method for Providing Enhanced Graphics in a Video Environment," Inventors: John M. Kanalakis, Jr., et al.

U.S. Appl. No. 12/957,116, filed Nov. 30, 2010, entitled "System and Method for Gesture Interface Control," Inventors: Shuan K. Kirby, et al.

U.S. Appl. No. 13/036,925, filed Feb. 28, 2011, entitled "System and Method for Selection of Video Data in a Video Conference Environment," Inventor(s) Sylvia Olayinka Aya Manfa N'guessan.

U.S. Appl. No. 12/907,925, filed Oct. 19, 2010, entitled "System and Method for Providing a Pairing Mechanism in a Video Environment," Inventors: Gangfeng Kong et al.

U.S. Appl. No. 12/939,037, filed Nov. 3, 2010, entitled "System and Method for Managing Flows in a Mobile Network Environment," Inventors: Balaji Venkat Venkataswami et al.

(56) References Cited

OTHER PUBLICATIONS

U.S. Appl. No. 13/096,772, filed Apr. 28, 2011, entitled "System and Method for Providing Enhanced Eye Gaze in a Video Conferencing Environment," Inventors: Charles C. Byers et al.
U.S. Appl. No. 12/946,709, filed Nov. 15, 2010, entitled "System and Method for Providing Enhanced Graphics in a Video Environment," Inventors: John M. Kanalakis, Jr., et al.
U.S. Appl. No. 13/098,430, filed Apr. 30, 2011, entitled "System and Method for Transferring Transparency Information in a Video Environment," Inventors: Eddie Collins et al.
U.S. Appl. No. 13/096,795, filed Apr. 28, 2011, entitled "System and Method for Providing Enhanced Eye Gaze in a Video Conferencing Environment," Inventors: Charles C. Byers et al.
U.S. Appl. No. 12/784,257, filed May 20, 2010, entitled "Implementing Selective Image Enhancement," Inventors: Dihong Tian et al.
Design U.S. Appl. No. 29/389,651, filed Apr. 14, 2011, entitled "Video Unit With Integrated Features," Inventor(s): Kyle A. Buzzard et al.
Design U.S. Appl. No. 29/389,654, filed Apr. 14, 2011, entitled "Video Unit With Integrated Features," Inventor(s): Kyle A. Buzzard et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.
Design U.S. Appl. No. 29/381,254, filed Dec. 16, 2010, entitled "Interface Element," Inventor(s): John M. Kanalakis, Jr., et al.
Design U.S. Appl. No. 29/381,256, filed Dec. 16, 2010, entitled "Interface Element," Inventor(s): John M. Kanalakis, Jr., et al.
Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Kanalakis, Jr., et al.
PCT "International Search Report and the Written Opinion of the International Searching Authority, or the Declaration," PCT/US2010/026456, dated Jun. 29, 2010; 11 pages.
PCT "Notification of Transmittal of the International Search Report and the Written Opinion of the International Searching Authority, or the Declaration," PCT/US2009/001070, dated Apr. 4, 2009; 14 pages.
PCT "Notification of Transmittal of the International Search Report and the Written Opinion of the International Searching Authority, or the Declaration," PCT/US2009/038310; dated Oct. 10, 2009; 17 pages.
PCT "International Preliminary Report on Patentability and Written Opinion of the International Searching Authority," PCT/US2009/038310; dated Sep. 28, 2010; 10 pages.
PCT "International Preliminary Report on Patentability dated Sep. 29, 2009, International Search Report, and Written Opinion," for PCT International Application PCT/US2008/058079; dated Sep. 18, 2008, 10 pages.
"3D Particles Experiments in AS3 and Flash CS3," [retrieved and printed on Mar. 18, 2010]; 2 pages; http://www.flashandmath.com/advanced/fourparticles/notes.html.
3G, "World's First 3G Video Conference Service with New TV Commercial," Apr. 28, 2005, 4 pages; http://www.3g.co.uk/PR/April2005/1383.htm.
Digital Video Enterprises, "DVE Eye Contact Silhouette," 1 page, © DVE 2008; http://www.dvetelepresence.com/products/eyeContactSilhouette.asp.
France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.
Joshua Gluckman and S.K. Nayar, "Rectified Catadioptric Stereo Sensors," 8 pages, retrieved and printed on May 17, 2010; http://cis.poly.edu/~gluckman/papers/cvpr00.pdf.
R.V. Kollarits, et al., "34.3: An Eye Contact Camera/Display System for Videophone Applications Using a Conventional Direct-View LCD," © 1995 SID, ISSNN0097-0966X/95/2601, pp. 765-768; http://citeseerx.ist.psu.edu/viewdoc/download;jsessionid=47A1E7E028C26503975E633895D114EC?doi=10.1.1.42.1772&rep1&type=pdf.
Trevor Darrell, "A Real-Time Virtual Mirror Display," 1 page, Sep. 9, 1998; http://people.csail.mitedu/trevor/papers/1998-021/node6.html.
Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.
U.S. Appl. No. 14/055,427, filed Oct. 16, 2013, entitled "System and Method for Provisioning Flows in a Mobile Network Environment," Inventors: Balaji Vankat Vankataswami, et al.
U.S. Appl. No. 14/154,608, filed Jan. 14, 2014, entitled "System and Method for Extending Communications Between Participants in a Conferencing Environment," Inventors: Brian Baldino, et al.
PRC Aug. 28, 2013 SIPO First Office Action from Chinese Application No. 201080010988.X 7 pages.
PRC Nov. 26, 2013 SIPO First Office Action from Chinese Application No. 201080020670 5pgs.
PRC Apr. 3, 2013 SIPO Second Office Action from Chinese Application No. 200980119121.5; 16 pages.
PRC May 5, 2014 SIPO Second Office Action from Chinese Application No. 201080010988.x (English Translation Only).

* cited by examiner

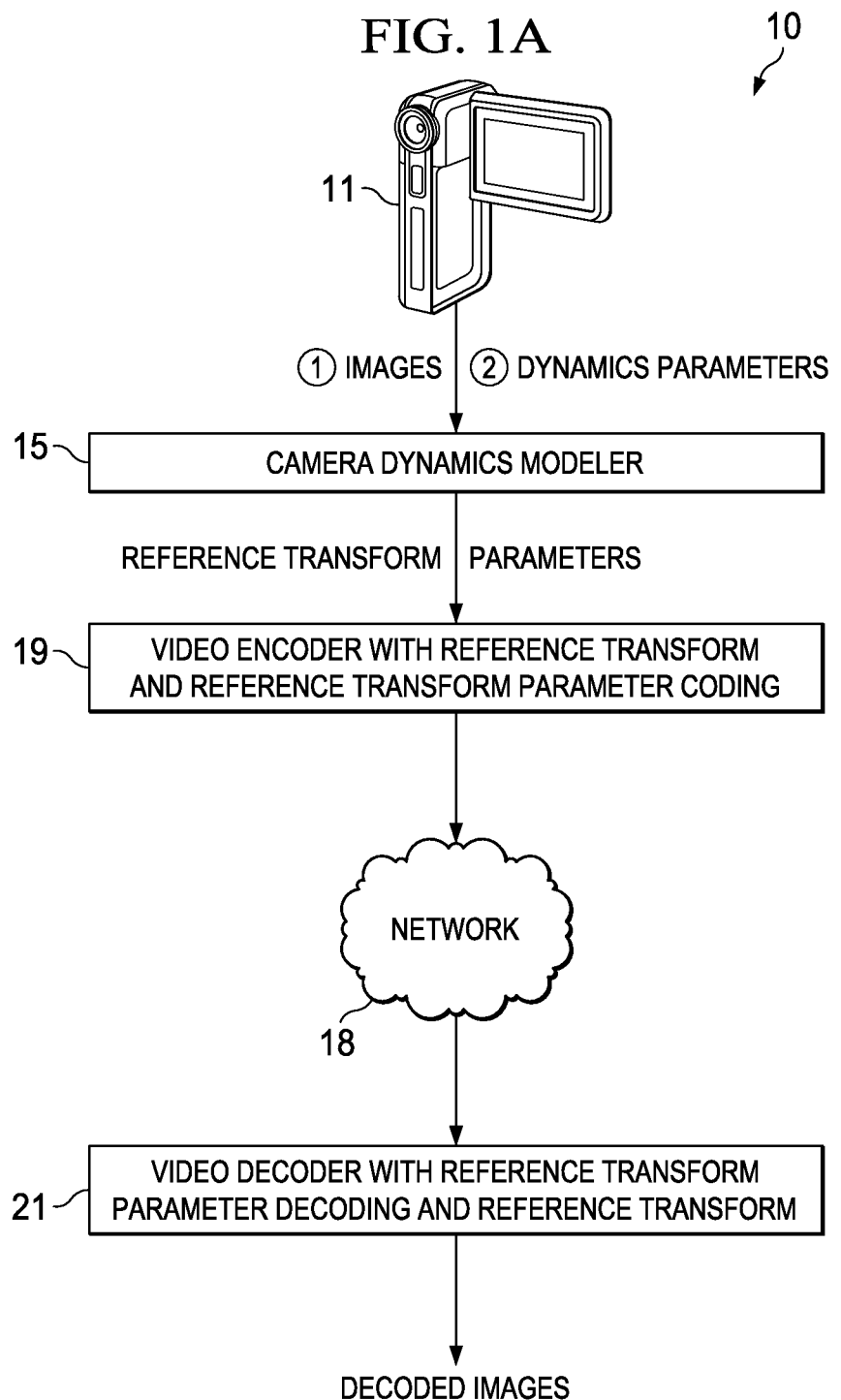

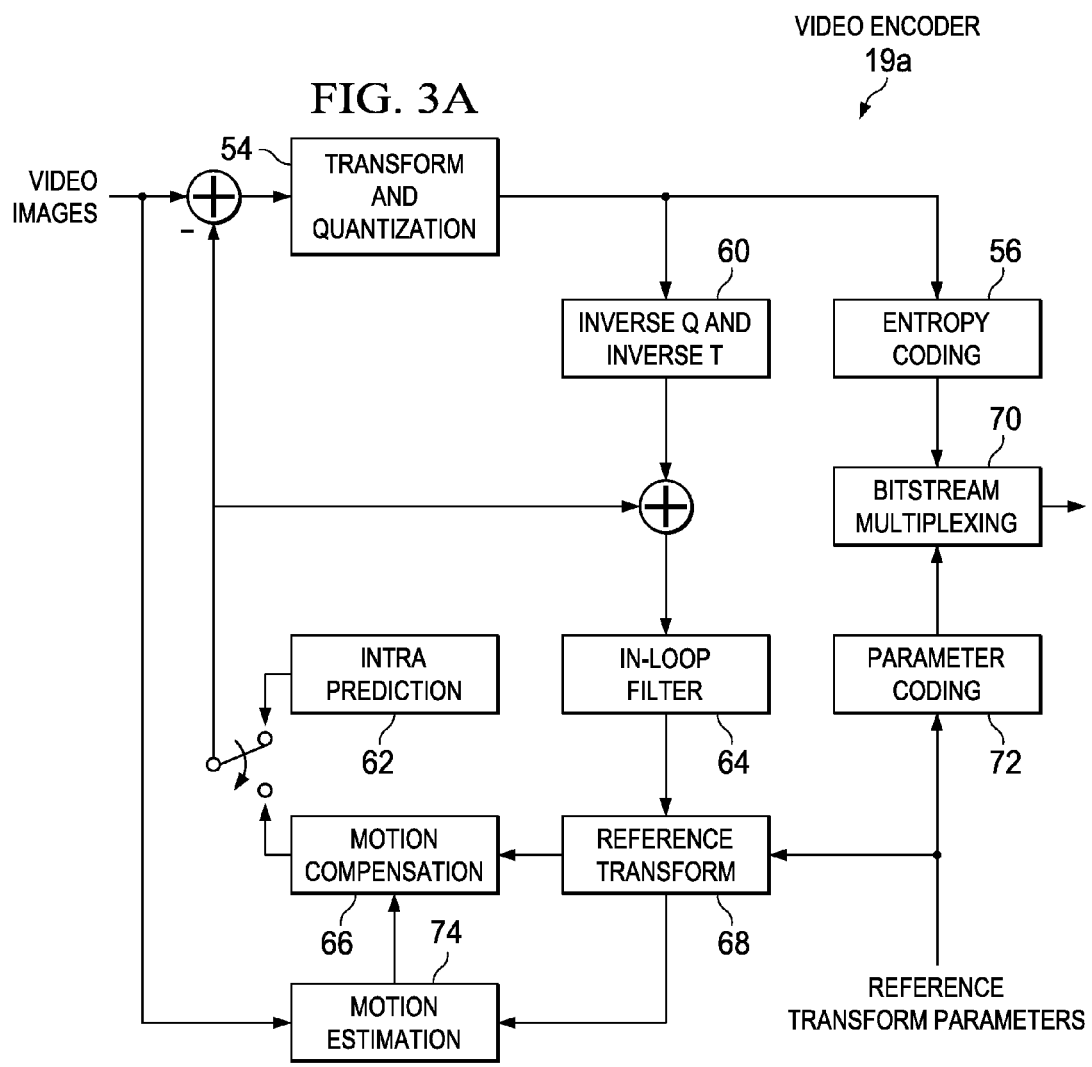

SYSTEM AND METHOD FOR VIDEO CODING IN A DYNAMIC ENVIRONMENT

TECHNICAL FIELD

This disclosure relates in general to the field of video and, more particularly, to video coding in a dynamic environment.

BACKGROUND

Video architectures have grown in complexity in recent times. The encoding and decoding of video can be important to the delivery of high quality video data. Real-time video coding systems that are connected to a video camera often encounter scene dynamics due to environmental variations and/or camera adjustments (e.g., change of exposure, color balance, and focus). Coding such dynamics with the toolset offered by existing video coding standards/systems is inherently flawed. As a result, the resulting video quality may be degraded considerably due to a budgeted bit rate. The ability to properly manage video coding activities and, further, to efficiently address problematic video conferencing scenarios presents a significant challenge to system designers, component manufacturers, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A is a simplified schematic diagram illustrating a system for video transmission in accordance with one embodiment of the present disclosure;

FIG. 3A is a simplified block diagram illustrating the flow of video data within a video encoder in accordance with one embodiment of the present disclosure;

DETAILED DESCRIPTION OF EXAMPLE EMBODIMENTS

Overview

Figure 1B:
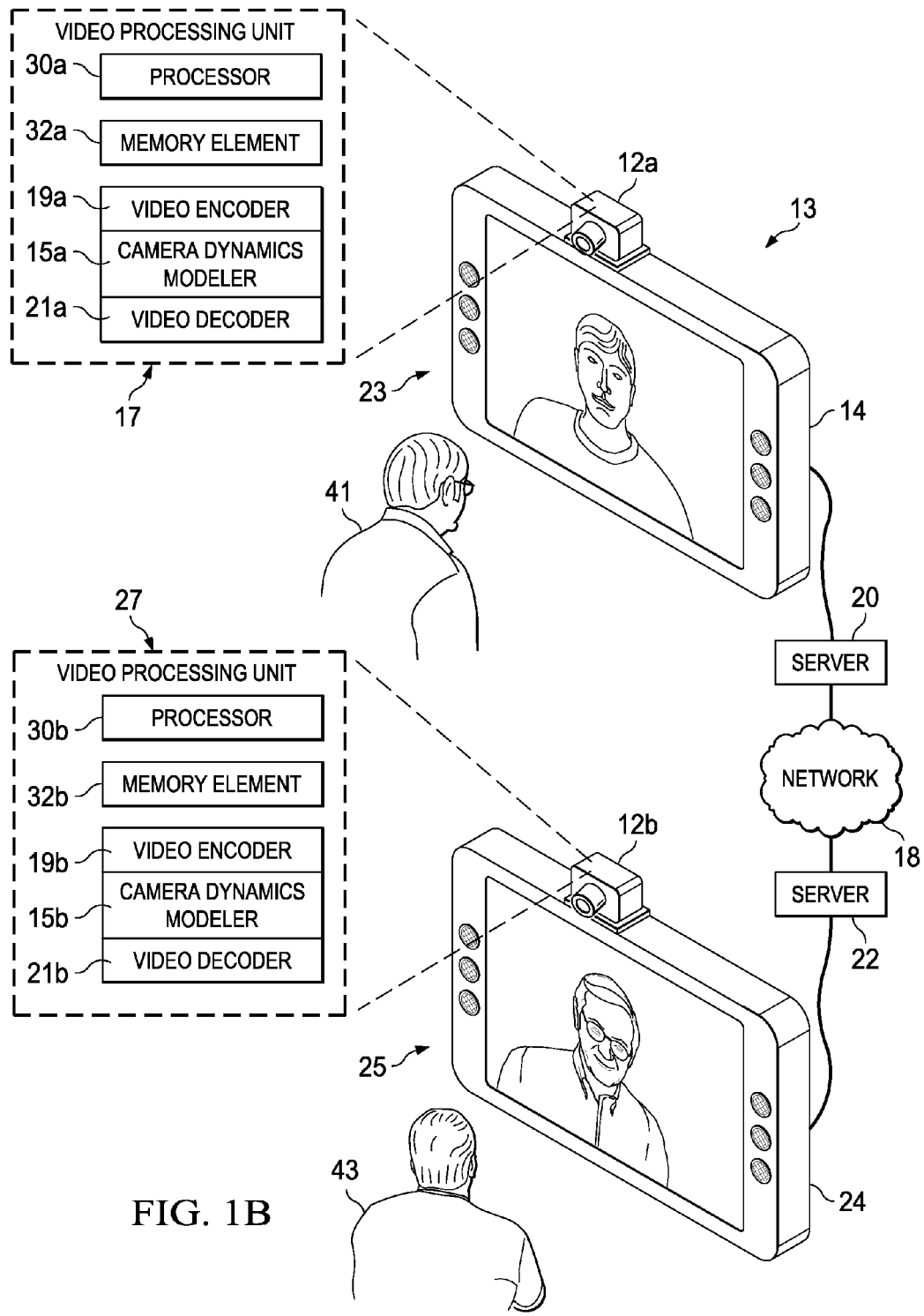
FIG. 1B is a simplified schematic diagram illustrating a system in accordance with one embodiment of the present disclosure.

A method is provided in one example embodiment and includes receiving a camera dynamic parameter; determining a reference transform parameter based on the camera dynamic parameter; applying the reference transform parameter to generate a video image; and encoding the reference transform parameter in a bitstream for transmission with the video image. The camera dynamic parameter can be any number of possible characteristics such as a pan-tilt-zoom characteristic of the video camera; an exposure characteristic of the video camera; a white balance characteristic of the video camera; a focus characteristic of the video camera, or any other characteristic relevant to the associated video platform.

In specific implementations, the receiving of the camera dynamic parameter further includes capturing the video image with a video camera; and determining the camera dynamic parameter by analysis of adjustments made by the video camera during capturing of video images. The reference transform parameter can be related to any number of possible parameters such as an affine transformation, a multiplicative modeling, an exponential modeling, a point-spread function, or any other suitable parameter particular to the video architecture.

In other instances, the method may include applying motion estimation and compensation to a reference transformed video signal. Additionally, the method may include decoding a particular video image; decoding a particular reference transform parameter; and applying a particular reference transform parameter to the particular video image. The entropy-decoded data can undergo inverse quantization and transformation such that reference transformed data is combined with the entropy-decoded data. Additionally, the entropy-decoded data can be subjected to filtering before decoded video images are rendered on a display. Additionally, encoding the reference transform parameter in the bitstream can include encoding one or more indications, such as which previously-processed video image is transformed with the reference transform parameter, and which video image is encoded using a transformed previously processed image.

EXAMPLE EMBODIMENTS

Turning to FIG. 1A, FIG. 1A is a simplified schematic diagram illustrating a system 10 for video transmission in accordance with one embodiment of the present disclosure. In this particular implementation, system 10 is representative of an architecture for encoding/decoding a video image over a network utilizing camera dynamics modeling. System 10 includes a camera 11, a camera dynamics modeler 15, a video encoder 19, a network 18, and a video decoder 21.

In accordance with the teachings of the present disclosure, data encoding/decoding technology of system 10 can utilize camera dynamics modeling in order to increase the efficiency of the data encoding/decoding operations. System 10 can be configured to offer a reference picture transform to the video coding toolset in order to improve compression under camera dynamics. The proposed transform can be applied to one (or a plurality) of reference pictures to obtain a new reference. The parameters that describe the transform can be coded and transmitted (along with the bitstream) to the decoder (regulated by rate-distortion optimization). More specifically, system 10 allows for a model-based manipulation on pixels in the reference picture to order to obtain a new reference, which provides a better prediction to the coded picture. Such a solution could be especially beneficial for certain video conferencing systems associated with coding scene dynamics due to camera adjustments.

Note that scene dynamics introduced by environment variation and camera adjustment are structured (and, therefore, can be modeled), while current coding tools fail in leveraging this framework. This causes a degradation of video quality (e.g., under a constant bit rate scenario (CBR)). System 10 offers a model-based transform that mimics the variation occurring within the camera, and that can be applied to the reference picture to improve coding. The parameters of the transform can be determined with aid from the camera logic.

In operational terms, camera 11 can be configured to capture images, where the images along with camera dynamics parameters are transmitted to camera dynamics modeler 15. Camera dynamics modeler 15 utilizes the camera dynamics parameters to create reference transform parameters, which are subsequently transmitted to video encoder 19. Video encoder 19 then applies the reference transform parameters to the video images, encodes images, and transmits them along with reference transform parameters via network 18 to video decoder 21. Hence, the reference transform parameters are applied to previously processed video images, and the transformed image is used as a prediction reference for encoding the current image. Transformed video images are then decoded utilizing the reference transform parameters, and the decoded images can be displayed as a video.

Semantically, parameters that describe the transform can be coded and transmitted along with the bitstream to the decoder. Rate-distortion optimization can be extended to regulate the bit rate savings against the overhead for coding the transform parameters. In one example embodiment associated with a Telepresence videoconferencing platform, a real-time video encoder can be connected to a video camera having auto adjustment capabilities. Additionally, the architecture may be performing CBR encoding in this scenario.

In one instance, where scene dynamics are caused by a change of environment lighting and/or the camera's adjustment of exposure/color balance in response to an environment change, the change of pixel values due to exposure/color balance variation may be approximated by a linear (or a polynomial model), and as a function of pixel coordinates. For example, the closer to the light source, the more significant the pixel variation. To encode the video frame produced with the exposure/color balance variation, the approximated transform model is first applied to the previously-coded picture (i.e., the reference picture). The output can then be used for motion compensated prediction (MCP). By doing so, fewer or less significant prediction residuals would need to be encoded after the MCP. Because this model-based reference transform occurs within the decoding loop, it can be replicated at the decoder side (e.g., provided by the transform parameters). Note that it is not necessary to have only one transform for the entire picture. Depending on the exact exposure/color balance adjustment being performed at the camera, multiple transforms may be used to approximate the pixel variation in different regions.

In another embodiment, picture changes due to a camera focus adjustment may be modeled by one (or multiple) point spreading functions: each applying to objects at a certain depth. Note that certain cameras may perform pan-tilt-zoom (PTZ) along with the aforementioned adjustments, in which case a global affine transform may be used to model the PTZ, and the reference transforms may be cascaded.

Determination of the type of reference transform and its corresponding parameters can be an encoder task. In practice, a few representative transform types may be pre-defined between the encoder and the decoder, and the parameters may be determined with input from the camera logic (e.g., the camera's intrinsic and extrinsic parameters, gain settings (before and after adjustment), etc.). The type of the reference transform can be coded as an index in the bitstream, followed by the parameters. The use of one or multiple reference transforms and corresponding bit rate savings can be evaluated along with other coding modes (e.g., intra-prediction, towards improved overall rate-distortion performance).

Consider an example involving a home video conferencing platform. The camera quickly adapts its optical focus to the scene by performing constant (frame-by-frame) fine-scale adjustment: making an adjustment in one direction, performing measurement, moving one step further, or correcting to the other direction (depending on the measurement). Video encoders do not intelligently respond to such frame-to-frame variations and, further, fail to code them efficiently (i.e., simply treating them as motion). System 10 is configured to identify such dynamics from the actual object motion, appropriately model them, and then compensate for them by a parametric transform on the reference picture. This may be as simple as the somewhat limited weighted prediction (block-wise linear), or as sophisticated as a global, un-linear transformation (e.g., point spread function). One important capability of system 10 is that the architecture can leverage signals from the camera to determine when and how the transformation should be applied.

System 10 is configured to model camera dynamics by digital transformation and, subsequently, apply that to improve video coding. Such a transformation can be in either the spatial domain, in the range domain, or in both. PTZ represents the most intuitive example, where the camera dynamics can be modeled by an affine transform. In this case, applying a global, affine transform to the reference picture (prior to MCP) performs better than existing coding flows.

In certain example implementations, the result of the camera automatically adjusting exposure/white balance is reflected in the range domain, which is another form of dynamics that can be modeled by a parametric transformation and that can be applied to improve coding. An exponential or polynomial curve may well approximate such dynamics in the range domain. System 10 can consider parametric, global (or region-based) transforms that could be linear or nonlinear, and which could transform toward both lower and higher ranges, as camera dynamics can vary in both directions. Note that a camera may be performing multiple adjustments at the same time and, therefore, the transformation applied to the reference picture could be a combination of parametric transforms described herein. Additionally, the transform parameters can be derived or calibrated from camera mechanics/electronics.

Referring now to FIG. 1B, FIG. 1B is a simplified schematic illustrating a system 13 in accordance with the teachings of the present disclosure. In particular, system 13 can be configured to offer three significant transforms that can collectively address problems presented by large-scale scene changes. First, system 13 can efficiently adjust for movement of the camera, such as PTZ adjustments. Second, system 13 can adjust for exposure/white balance changes in the camera. Third, system 13 can adjust for focus changes in the camera, such as when a person in the camera moves closer to, or further from, the camera. Operating together, these coding components can be configured to determine which transforms to apply to each image that includes camera dynamic changes. By minimizing the amount of new data that has to be fully encoded and decoded, the architecture can minimize processing power and bandwidth consumption in the system. Before detailing additional operations associated with the present disclosure, some preliminary information is provided about the corresponding infrastructure of FIG. 1B.

System 13 includes two distinct communication systems that are represented as endpoints 23 and 25, which can be provisioned in different geographic locations. Endpoint 23 may include a display 14, a camera 12a, and a video processing unit 17. In this embodiment, video processing unit 17 is integrated into display 14; however, video processing unit 17 could readily be a stand-alone unit as well, or within the camera 12a itself.

Endpoint 25 may similarly include a display 24, a camera 12b, and a video processing unit 27. Additionally, endpoints 23 and 25 may be coupled to a server 20, 22 respectively, where the endpoints are connected to each other via network 18. Each video processing unit 17, 27 may further include a respective processor 30a, 30b, a respective memory element 32a, 32b, a respective video encoder 19a, 19b, a respective camera dynamics modeler 15a, 15b, and a respective decoder 21a, 21b. The function and operation of these elements is discussed in detail below. In the context of a conference involving a participant 41 (present at endpoint 23) and a participant 43 (present at endpoint 25), packet information may propagate over network 18 during the conference. As each participant 41 and 43 communicates, cameras 12a, 12b suitably capture the scene as a video signal. Each video processing unit 17, 27 evaluates this video signal and then determines which data to send to the other location for rendering on displays 14, 24.

Displays 14, 24 are screens at which video data can be rendered for one or more end users. Note that as used herein in this Specification, the term 'display' is meant to connote any element that is capable of delivering image data (inclusive of video information), text, sound, audiovisual data, etc. to an end user. This would necessarily be inclusive of any panel, plasma element, television, display, computer interface, screen, Telepresence devices (inclusive of Telepresence boards, panels, screens, walls, surfaces, etc.) or any other suitable element that is capable of delivering, rendering, or projecting such information.

Cameras 12a, 12b are generally mounted proximate to their respective displays 14, 24. Cameras 12a, 12b can be wireless cameras, high-definition cameras, or any other suitable camera device configured to capture image data. As can be seen in comparing the handheld camera 11 in FIG. 1A and the mounted cameras 12a, 12b of FIG. 1B, the term 'camera' as used herein is not limited to cameras of any one type or design. In terms of their physical deployment, in one particular implementation, cameras 12a, 12b are digital cameras, which are mounted on the top (and at the center of) displays 14, 24. One camera can be mounted on each respective display 14, 24. Other camera arrangements and camera positioning is certainly within the broad scope of the present disclosure.

A respective participant 41 and 43 may reside at each location for which a respective endpoint 23, 25 is provisioned. Endpoints 23 and 25 are representative of devices that can be used to facilitate data propagation. In one particular example, endpoints 23 and 25 are representative of video conferencing endpoints, which can be used by individuals for virtually any communication purpose. It should be noted however that the broad term 'endpoint' can be inclusive of devices used to initiate a communication, such as any type of computer, a personal digital assistant (PDA), a laptop or electronic notebook, a cellular telephone, an iPhone, an IP phone, an iPad, a Google Droid, or any other device, component, element, or object capable of initiating or facilitating voice, audio, video, media, or data exchanges within system 10 or system 13. Hence, video processing unit 17 can be readily provisioned in any such endpoint. Endpoints 23 and 25 may also be inclusive of a suitable interface to the human user, such as a microphone, a display, or a keyboard or other terminal equipment. Endpoints 23 and 25 may also be any device that seeks to initiate a communication on behalf of another entity or element, such as a program, a database, or any other component, device, element, or object capable of initiating an exchange within system 13 or system 10. Data, as used herein in this document, refers to any type of numeric, voice, video, media, or script data, or any type of source or object code, or any other suitable information in any appropriate format that may be communicated from one point to another.

Each endpoint 23, 25 can also be configured to include a receiving module, a transmitting module, a processor, a memory, a network interface, a call initiation and acceptance facility such as a dial pad, one or more speakers, one or more displays, etc. Any one or more of these items may be consolidated, combined, or eliminated entirely, or varied considerably, where those modifications may be made based on particular communication needs.

Note that in one example, each endpoint 23, 25 can have internal structures (e.g., a processor, a memory element, etc.) to facilitate the operations described herein. In other embodiments, these audio and/or video features may be provided externally to these elements or included in some other proprietary device to achieve their intended functionality. In still other embodiments, each endpoint 23, 25 may include any suitable algorithms, hardware, software, components, modules, interfaces, or objects that facilitate the operations thereof.

Network 18 represents a series of points or nodes of interconnected communication paths for receiving and transmitting packets of information that propagate through system 13 or system 10. Network 18 offers a communicative interface between any of the nodes of FIG. 1B, and may be any local area network (LAN), wireless local area network (WLAN), metropolitan area network (MAN), wide area network (WAN), virtual private network (VPN), Intranet, Extranet, or any other appropriate architecture or system that facilitates communications in a network environment. Note that in using network 18, system 13 or system 10 may include a configuration capable of transmission control protocol/internet protocol (TCP/IP) communications for the transmission and/or reception of packets in a network. System 13 or system 10 may also operate in conjunction with a user datagram protocol/IP (UDP/IP) or any other suitable protocol, where appropriate and based on particular needs.

Each video processing unit 17, 27 is configured to evaluate video data and make determinations as to which data should be rendered, coded, skipped, manipulated, transformed, analyzed, or otherwise processed within system 13 or system 10. As used herein in this Specification, the term 'video element' is meant to encompass any suitable unit, module, software, hardware, server, program, application, application program interface (API), proxy, processor, field programmable gate array (FPGA), erasable programmable read only memory (EPROM), electrically erasable programmable ROM (EEPROM), application specific integrated circuit (ASIC), digital signal processor (DSP), or any other suitable device, component, element, or object configured to process video data. This video element may include any suitable hardware, software, components, modules, interfaces, or objects that facilitate the operations thereof. This may be inclusive of appropriate algorithms and communication protocols that allow for the effective exchange (reception and/or transmission) of data or information.

Note that each video processing unit 17, 27 may share (or coordinate) certain processing operations (e.g., with respective endpoints 23, 25). Using a similar rationale, their respective memory elements may store, maintain, and/or update data in any number of possible manners. Additionally, because some of these video elements can be readily combined into a single unit, device, or server (or certain aspects of these elements can be provided within each other), some of the illustrated processors may be removed, or otherwise consolidated such that a single processor and/or a single memory location could be responsible for certain activities associated with modeling camera dynamics controls. In a general sense, the arrangement depicted in FIG. 1B may be more logical in its representations, whereas a physical architecture may include various permutations/combinations/hybrids of these elements.

In one example implementation, video processing units 17, 27 include software (e.g., as part of camera dynamics modeler 15a-b, video encoder 19a-b, video decoder 21a-b, respectively) to achieve the intelligent modeling of camera dynamics operations, as outlined herein in this document. In other embodiments, this feature may be provided externally to any of the aforementioned elements, or included in some other video element or endpoint (either of which may be proprietary) to achieve this intended functionality. Alternatively, several elements may include software (or reciprocating software) that can coordinate in order to achieve the operations, as outlined herein. In still other embodiments, any of the devices of the illustrated FIGURES may include any suitable algorithms, hardware, software, components, modules, interfaces, or objects that facilitate these modeling camera dynamics management operations, as disclosed herein.

Video processing unit 17 is configured to receive information from camera 12a via some connection, which may attach to an integrated device (e.g., a set-top box, a proprietary box, etc.) that can sit atop a display. Video processing unit 17 may also be configured to control compression activities, or additional processing associated with data received from the cameras. Alternatively, a physically separate device can perform this additional processing before image data is sent to its next intended destination. Video processing unit 17 can also be configured to store, aggregate, process, export, and/or otherwise maintain image data and logs in any appropriate format, where these activities can involve processor 30a and memory element 32a. In certain example implementations, video processing units 17 and 27 are part of set-top box configurations. In other instances, video processing units 17, 27 are part of a server (e.g., servers 20 and 22). In yet other examples, video processing units 17, 27 are network elements that facilitate a data flow with their respective counterparty. As used herein in this Specification, the term 'network element' is meant to encompass routers, switches, gateways, bridges, loadbalancers, firewalls, servers, processors, modules, or any other suitable device, component, element, or object operable to exchange information in a network environment. This includes proprietary elements equally, which can be provisioned with particular features to satisfy a unique scenario or a distinct environment.

Video processing unit 17 may interface with camera 12a through a wireless connection, or via one or more cables or wires that allow for the propagation of signals between these two elements. These devices can also receive signals from an intermediary device, a remote control, etc., where the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between video processing unit 17 and camera 12a. Transmissions between these two sets of devices can be bidirectional in certain embodiments such that the devices can interact with each other (e.g., dynamically, real-time, etc.). This would allow the devices to acknowledge transmissions from each other and offer feedback, where appropriate. Any of these devices can be consolidated with each other, or operate independently based on particular configuration needs. For example, a single box may encompass audio and video reception capabilities (e.g., a set-top box that includes video processing unit 17, along with camera and microphone components for capturing video and audio data).

Figure 2:
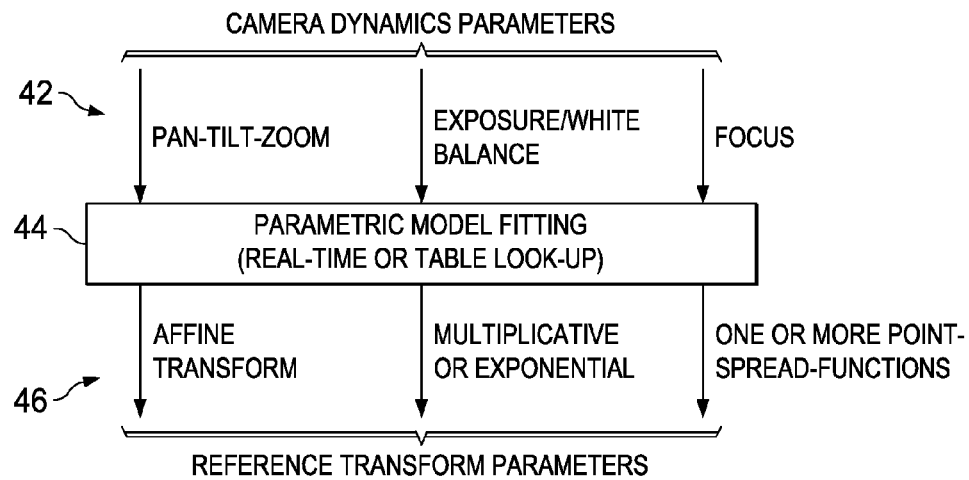
FIG. 2 is a simplified block diagram illustrating the development of reference transform parameters in accordance with one embodiment of the present disclosure.

Turning to FIG. 2, FIG. 2 is a simplified block diagram illustrating the development of reference transform parameters within the camera dynamics modeler in accordance with one embodiment of the present disclosure. In the camera dynamics modeler, different camera dynamics parameters 42 are examined and a transform 46 is developed for each property that is changing in the data.

For example, in operational terms for this embodiment, three parameters 42 are examined for dynamic changes: pan-tilt-zoom, exposure/white balance, and focus. When a change is detected within any of camera dynamics parameters 42, that parameter is fitted to a parametric model via real-time manipulation or a table look-up of known transforms at 44, and transform 46 is assigned to the parameter. In the present example, the pan-tilt-zoom parameter utilizes an affine transform; the exposure/white balance utilizes a multiplicative or exponential transform; and the focus utilizes one or more point-spread-functions. Once the transform has been applied, the reference transform parameters have been developed and can subsequently be utilized.

In practice, a few representative transform types may be pre-defined between the encoder and the decoder, and the parameters may be determined with input from the camera logic, e.g., the camera's intrinsic and extrinsic parameters, gain settings (before and after adjustment), etc. The type of the reference transform will be coded as an index in the bitstream, followed by the parameters. The use of one or multiple reference transforms and corresponding bit rate savings can be evaluated along with other coding modes to improve overall rate distortion performance.

Referring now to FIG. 3A, FIG. 3A is a simplified diagram illustrating an example flow of video data within video encoder 19a. In this representative embodiment, where scene dynamics are caused by a change of environment lighting and/or the camera's adjustment of exposure/white balance in response to an environment change, the change of pixel values due to exposure/white balance variation may be approximated by a linear or polynomial model and/or as a function of pixel coordinates (the closer to the light source, the more significant pixel variation, for example).

As the video images enter into the data flow of video encoder 19a, the image first undergoes a transformation and quantization at 54. As appropriate, the images either are sent toward an output bitstream multiplexer 70 (after undergoing an entropy coding 56) or propagate through an inverse quantization and transformation 60. This embodiment utilizes the H.264/AVC video coding standard, where the inverted images have an in-loop (or deblocking) filter 64 being applied.

To encode the video frame produced with the exposure/white balance variation, an approximated transform model is first applied to a previously coded picture (e.g., the reference picture) at reference transform 68. The output can then be used for MCP. This may include a motion estimation 74, a motion compensation 66, and an intra prediction 62. By doing so, fewer or less significant prediction residuals need to be encoded after the MCP. Because this model-based reference transform occurs within the decoding loop, it can be replicated at the decoder side. Note that it is not necessary to have only one transform for the entire picture. Depending on how exposure/white balance adjustment is performed at the camera, multiple transforms may be used to approximate the pixel variation in different regions of any video image.

Reference transform parameters that describe the transform are coded at parameter coding 72. These coded parameters are then combined with the coded video images to form a bitstream at bitstream multiplexer 70, and transmitted to decoder 21b. Accordingly, rate-distortion optimization can be extended to regulate the bit rate savings against the overhead for coding the transform parameters.

In another embodiment, picture changes due to a camera focus adjustment may be modeled by one or multiple point spreading functions, each applying to objects at certain depth. Alternatively, some cameras may perform PTZ along with the aforementioned adjustment, in which case a global affine transform may be used to model the PTZ and the reference transforms may be cascaded.

Figure 3B:
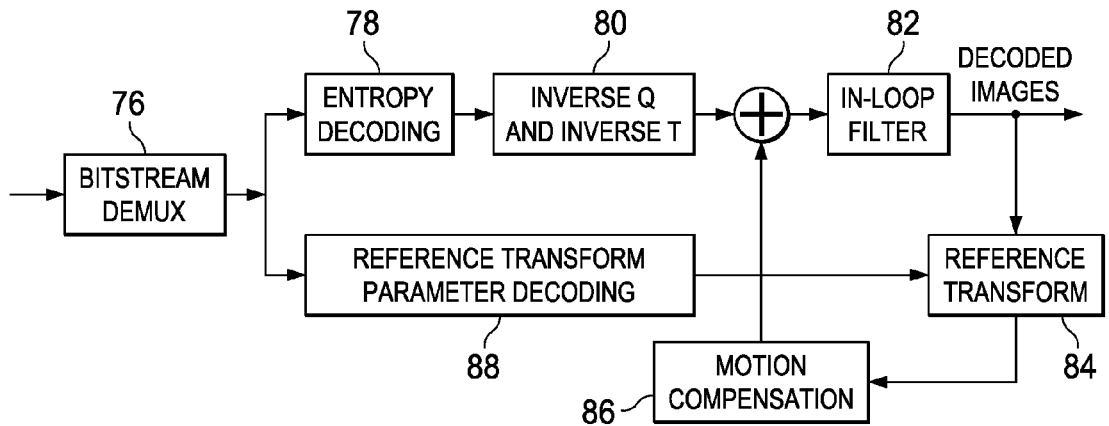
FIG. 3B is a simplified block diagram illustrating the flow of video data within a video decoder in accordance with one embodiment of the present disclosure.

Referring now to FIG. 3B, FIG. 3B is a simplified diagram illustrating the flow of video data within video decoder 21b in accordance with one embodiment of the present disclosure. The bitstream enters the video decoder 21b at a bitstream demultiplexer 76, where the data is then transferred for an entropy decoding 78 or a reference transform parameter decoding 88 (depending on the activities that occurred at video encoder 19a). Once the reference transform parameters are decoded, a reference transform 84 is applied to the data, and then motion compensation 86 occurs. The entropy-decoded data undergoes inverse quantization and transformation at 80, and the reference transformed data can be combined with the entropy-decoded data and subjected to an in-loop filter 82. The then decoded images are ready to be displayed.

Figure 4:
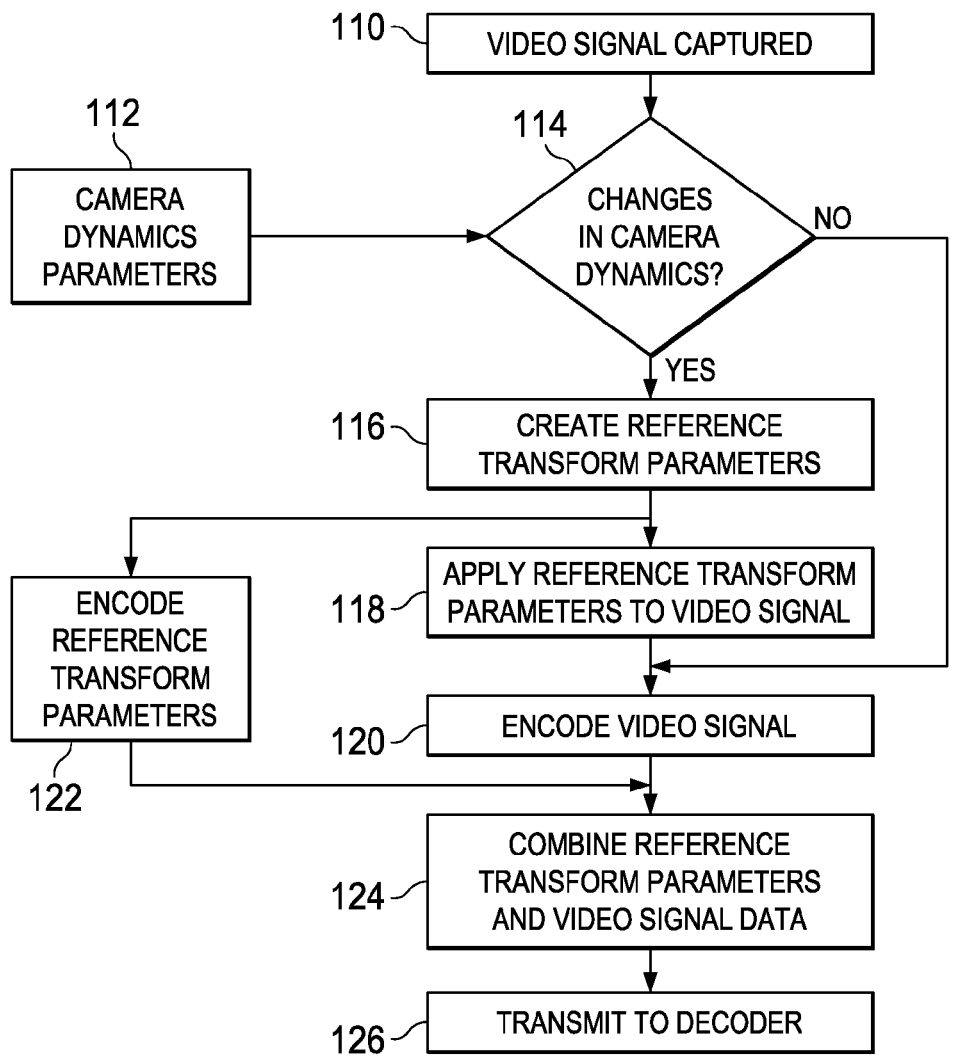
FIG. 4 is a simplified flowchart illustrating example operations associated with one embodiment of the present disclosure.

Referring now to FIG. 4, FIG. 4 is a simplified flowchart illustrating example operations associated with one embodiment of system 10. The operations begin at 110 when a video signal is captured. Camera dynamics parameters 112 are then compared to the captured video signal at 114, where the signal is analyzed to determine if there have been changes in the camera dynamics. If there are no changes currently in the camera dynamics, the video signal passes through to be encoded at 120.

If camera dynamics changes did occur, the type of change is determined and utilized to create reference transform parameters at 116. Reference transform parameters are then applied to the video signal at 118 to create the transformed video signal. A video signal is then encoded and meshed together with any video signal without dynamic changes as necessary at 120. Hence, the reference transform parameters are applied to previously-processed video images, and the transformed image is used as a prediction reference for encoding the current image. As the reference transform parameters are being applied at 118, the reference transform parameters are also being encoded at 122. The encoded video signal from 120 and the encoded reference transform parameters are then combined at 124 and transmitted at 126. In some embodiments, a similar process is occurring at the second location (i.e., the counterparty endpoint), where video data is also being sent from the second location to the first.

Note that in certain example implementations, the video processing functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1B] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1B] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, endpoints 23, 25 can include software in order to achieve the modeling camera dynamics coding outlined herein. This can be provided through instances of video processing units 17, 27 (which can be provisioned in cameras, and set-top boxes, or any other suitable location). Additionally, each of these endpoints may include a processor that can execute software or an algorithm to perform the modeling camera dynamics coding activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.' Each endpoint 23, 25 can also include suitable interfaces for receiving, transmitting, and/or otherwise communicating data or information in a network environment.

It is also important to note that the steps in the preceding flow diagrams illustrate only some of the possible conferencing scenarios and patterns that may be executed by, or within, system 13 and system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 13 or system 10 in that any suitable arrangements, chronologies, configurations, and timing mechanisms may be used on conjunction with the architecture without departing from the teachings of the present disclosure.

Note that with the example provided above, as well as numerous other examples provided herein, interaction may be described in terms of two or three components. However, this has been done for purposes of clarity and example only. In certain cases, it may be easier to describe one or more of the functionalities of a given set of flows by only referencing a limited number of components. It should be appreciated that system 13 or system 10 (and its teachings) are readily scalable and can accommodate a large number of components, participants, rooms, endpoints, sites, etc., as well as more complicated/sophisticated arrangements and configurations. Accordingly, the examples provided should not limit the scope or inhibit the broad teachings of system 13 and system 10, as potentially applied to a myriad of other architectures. In other instances, system 13 and system 10 can be applied in video surveillance applications in order to appropriately offer modeling camera dynamics coding to improve system performance. Additionally, applications such as Skype (or any application associated with handheld devices) can readily utilize the teachings of the present disclosure.

Although the present disclosure has been described in detail with reference to particular embodiments, it should be understood that various other changes, substitutions, and alterations may be made hereto without departing from the spirit and scope of the present disclosure. For example, although the previous discussions have focused on videoconferencing associated with particular types of endpoints, handheld devices that employ video applications could readily adopt the teachings of the present disclosure. For example, iPhones, iPads, Google Droids, personal computing applications (i.e., desktop video solutions), etc. can readily adopt and use the modeling camera dynamics operations detailed above. Any communication system or device that encodes video data would be amenable to the modeling camera dynamics features discussed herein.

It is also imperative to note that system 13 or system 10 can be used in any type of video applications. This can include standard video rate transmissions, adaptive bit rate (ABR), variable bit rate (VBR), CBR, or any other video technology in which camera dynamics can be utilized. System 13 or system 10 can readily be used in any such video environments, as the teachings of the present disclosure are equally applicable to all such alternatives and permutations. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a camera dynamic parameter that indicates a change in camera dynamics associated with a video image;
   determining a reference transform parameter based on the camera dynamic parameter;
   applying the reference transform parameter to a previously-processed video image to generate a reference video image;
   encoding the video image using the reference video image;
   encoding the reference transform parameter; and
   combining the encoded video image and the encoded reference transform parameter to form a bitstream for transmission.

2. The method of claim 1, wherein the camera dynamic parameter is a selected one of a group of parameters for a video camera, the group consisting of:
   a) pan-tilt-zoom characteristic of the video camera;
   b) an exposure characteristic of the video camera;
   c) a white balance characteristic of the video camera; and
   d) a focus characteristic of the video camera.

3. The method of claim 1, wherein receiving the camera dynamic parameter further includes:
   capturing the video image with a video camera; and
   determining the camera dynamic parameter by analysis of adjustments made by the video camera during capturing of video images.

4. The method of claim 1, wherein the reference transform parameter is a selected one of a group of parameters, the group consisting of:
   a) an affine transformation;
   b) a multiplicative modeling;
   c) an exponential modeling; and
   d) a point-spread function.

5. The method of claim 1, further comprising:
   applying motion estimation and compensation to a reference transformed video signal.

6. The method of claim 1, further comprising:
   decoding a particular video image;
   decoding a particular reference transform parameter; and
   applying a particular reference transform parameter to the particular video image, wherein entropy-decoded data undergoes inverse quantization and transformation such that reference transformed data is combined with the entropy-decoded data.

7. The method of claim 1, wherein encoding the reference transform parameter in the bitstream includes encoding which previously-processed video image is transformed with the reference transform parameter, and which video image is encoded using a transformed previously processed image.

8. Logic encoded in non-transitory tangible media that includes code for execution and when executed by a processor operable to perform operations comprising:
   receiving a camera dynamic parameter that indicates a change in camera dynamics associated with a video image;
   determining a reference transform parameter based on the camera dynamic parameter;
   applying the reference transform parameter to a previously-processed video image to generate a reference video image;
   encoding the video image using the reference video image;
   encoding the reference transform parameter; and
   combining the encoded video image and the encoded reference transform parameter to form a bitstream for transmission.

9. The logic of claim 8, wherein the camera dynamic parameter is a selected one of a group of parameters for a video camera, the group consisting of:
   a) pan-tilt-zoom characteristic of the video camera;
   b) an exposure characteristic of the video camera;
   c) a white balance characteristic of the video camera; and
   d) a focus characteristic of the video camera.

10. The logic of claim 8, wherein receiving the camera dynamic parameter further includes:
    capturing the video image with a video camera; and
    determining the camera dynamic parameter by analysis of adjustments made by the video camera during capturing of video images.

11. The logic of claim 8, wherein the reference transform parameter is a selected one of a group of parameters, the group consisting of:
    a) an affine transformation;
    b) a multiplicative modeling;
    c) an exponential modeling; and
    d) a point-spread function.

12. The logic of claim 8, the operations further comprising: applying motion estimation and compensation to a reference transformed video signal.

13. The logic of claim 8, the operations further comprising:
    decoding a particular video image;
    decoding a particular reference transform parameter; and
    applying a particular reference transform parameter to the particular video image, wherein entropy-decoded data undergoes inverse quantization and transformation such that reference transformed data is combined with the entropy-decoded data.

14. The logic of claim 8, wherein encoding the reference transform parameter in the bitstream includes encoding which previously-processed video image is transformed with the reference transform parameter, and which video image is encoded using a transformed previously processed image.

15. An apparatus, comprising:
    a video element;
    a memory element configured to store data; and
    a processor operable to execute instructions associated with the data such that the apparatus is configured for:
        receiving a camera dynamic parameter that indicates a change in camera dynamics associated with a video image;
        determining a reference transform parameter based on the camera dynamic parameter;
        applying the reference transform parameter to a previously-processed video image to generate a reference video image;
        encoding the video image using the reference video image;
        encoding the reference transform parameter; and
        combining the encoded video image and the encoded reference transform parameter to form a bitstream for transmission.

16. The apparatus of claim 15, wherein the camera dynamic parameter is a selected one of a group of parameters for a video camera, the group consisting of:
    a) pan-tilt-zoom characteristic of the video camera;
    b) an exposure characteristic of the video camera;
    c) a white balance characteristic of the video camera; and
    d) a focus characteristic of the video camera.

17. The apparatus of claim 15, wherein receiving the camera dynamic parameter further includes:
    capturing the video image with a video camera; and
    determining the camera dynamic parameter by analysis of adjustments made by the video camera during capturing of video images.

18. The apparatus of claim 15, wherein the reference transform parameter is a selected one of a group of parameters, the group consisting of:
    a) an affine transformation;
    b) a multiplicative modeling;
    c) an exponential modeling; and
    d) a point-spread function.

19. The apparatus of claim 15, wherein the apparatus is further configured for:
    applying motion estimation and compensation to a reference transformed video signal.

20. The apparatus of claim 15, wherein the apparatus is further configured for:
    decoding a particular video image;
    decoding a particular reference transform parameter; and
    applying a particular reference transform parameter to the particular video image, wherein entropy-decoded data undergoes inverse quantization and transformation such that reference transformed data is combined with the entropy-decoded data.

* * * * *